US012810174B2

(12) United States Patent
Lewis et al.

(10) Patent No.: US 12,810,174 B2
(45) Date of Patent: Nov. 24, 2026

(54) GENERATIVE MACHINE LEARNING MODELS FOR GENEALOGY

(71) Applicant: Ancestry.com Operations Inc., Lehi, UT (US)

(72) Inventors: Glen Brewer Lewis, Lehi, UT (US); Alexander Liss, Morgan Hill, CA (US); Daniel Val Shelley, Saratoga Springs, UT (US); Gary Lee Mangum, Springville, UT (US); Prashanth Santhanam, Lehi, UT (US); Anne Caitlyn Selleck, Lehi, UT (US); Liam Molloy, Lehi, UT (US); Michael Benjamin Brodie, Highland, UT (US)

(73) Assignee: Ancestry.com Operations Inc., Draper, UT (US)

( * ) Notice: Subject to any disclaimer, the term of this patent is extended or adjusted under 35 U.S.C. 154(b) by 328 days.

(21) Appl. No.: 18/635,988

(22) Filed: Apr. 15, 2024

(65) Prior Publication Data

US 2024/0346342 A1 Oct. 17, 2024

Related U.S. Application Data

(60) Provisional application No. 63/633,774, filed on Apr. 14, 2024, provisional application No. 63/582,192, filed on Sep. 12, 2023, provisional application No. 63/459,194, filed on Apr. 13, 2023.

(51) Int. Cl.

| | |
|---|---|
| ***G06N 5/022*** | (2023.01) |
| ***G06F 40/106*** | (2020.01) |
| ***G06F 40/284*** | (2020.01) |

(52) U.S. Cl.

CPC .......... *G06N 5/022* (2013.01); *G06F 40/106* (2020.01); *G06F 40/284* (2020.01)

(58) Field of Classification Search

CPC ........ G06N 5/022; G06N 3/044; G06N 3/045; G06N 5/01; G06N 7/01; G06F 40/106; G06F 40/284; G06F 40/30; G06F 40/56

USPC .......................................................... 706/46

See application file for complete search history.

(56) References Cited

U.S. PATENT DOCUMENTS

2025/0363306 A1* 11/2025 Shekhar ................. G06F 40/30

* cited by examiner

*Primary Examiner* — Usman A Khan

(74) *Attorney, Agent, or Firm* — Fenwick & West LLP

(57) ABSTRACT

Disclosed herein are methods, systems, and non-transitory computer readable mediums for generating a shareable genealogical summary for a target individual. An example method includes receiving a request from a user to generate a shareable genealogical summary about a target user. The method generates the shareable genealogical summary comprising a genealogical history of the target user. The method provides genealogical information for the target user to a machine-learning language model. The genealogical information includes a family tree. The method receives a response generated by executing the machine-learning language model from a model serving system. The method provides the shareable genealogical summary for display to the user.

20 Claims, 16 Drawing Sheets

300

500

850

| | |
|---|---|
| Name | **Earl Smith** |
| Age | 48 |
| Estimated Birth Year | abt 1892 |
| Gender | Male |
| Race | White |
| Birthplace | Michigan |
| Marital Status | Married |
| Relation to Head of House | Head |
| Home in 1940 | Beaver, Beaver, Utah |
| Map of Home in 1940 | Beaver,Beaver,Utah |
| Farm | NO |
| Inferred Residence in 1935 | Rural, Michigan |
| Residence in 1935 | Rural, Michigan |
| Resident on farm in 1935 | No |
| Sheet Number | 4B |
| Number of Household in Order of Visitation | 69 |
| Occupation | Mining |
| House Owned or Rented | Owned |
| Value of Home or Monthly Rental if Rented | 210 |
| Attended School or College | No |
| Highest Grade Completed | College, 1st year |
| Class of Worker | Working on own account |
| Weeks Worked in 1939 | 52 |
| Income Other Sources | Yes |
| Neighbors | View others on page |

*FIG. 8C*

GENERATIVE MACHINE LEARNING MODELS FOR GENEALOGY

CROSS-REFERENCE TO RELATED APPLICATIONS

The present application claims the benefit of U.S. Provisional Patent Application No. 63/459,194, filed on Apr. 13, 2023, U.S. Provisional Patent Application No. 63/582,192, filed on Sep. 12, 2023, and U.S. Provisional Patent Application No. 63/633,774, filed on Apr. 14, 2024, each of which is hereby incorporated by reference in its entirety.

FIELD

The disclosed embodiments relate to training and applying a machine-learning generative model in a complex large-data genealogy database.

BACKGROUND

A large-scale database such as a genealogy database can include billions of data records. This type of database may allow users to build family trees, research their family history, and make meaningful discoveries about the lives of their ancestors. Users may try to identify relatives with datasets in the database. However, identifying relatives in the sheer amount of data is not a trivial task. Datasets associated with different individuals may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

Ancestor data is often stored in trees which contain multiple persons or individuals. Trees may also include intra-tree relationships which indicate the relationships between the various individuals within a certain tree. In many cases, persons in one tree may correspond to persons in other trees, as users have common ancestors with other users. As such, one challenge in maintaining genealogical databases has been entity resolution, which refers to the problem of identifying and linking different manifestations of the same real-world entity. For example, many manifestations of the same person may appear across multiple trees. This problem arises due to discrepancies between different historical records, discrepancies between historical records and human accounts, and discrepancies between different human accounts. For example, different users having a common ancestor may have different opinions as to the name, date of birth, and place of birth of that ancestor. The problem becomes particularly prevalent when large amounts of historical documents are difficult to read or transcribe, causing a wide range of possible ancestor data. Accordingly, there is a need for improved techniques in the area.

When a person researches their family history using a genealogical database with records and user tree data, they often receive various ancestor data for their ancestor in raw form. For many people it is difficult to understand how this raw data translates into an ancestor's life and experience or how to connect that data to other information they have or is available from the time and place where that ancestor lived. Most people are interested in learning about their family history and the lives of their ancestors. However, very few people understand the connection between accessible family-tree information, public records, and learning more about that person's life, and the historical context.

SUMMARY

Disclosed herein relates to example embodiments that generate a shareable genealogical summary using a machine-learning language model. In one example method, generating a shareable genealogical summary includes receiving a request to generate a genealogical summary of a target user. The method includes retrieving genealogical records associated with the target user, the genealogical records including a documentation record and a family tree that is arranged in a hierarchical data structure comprising nodes connected by edges. The method includes identifying a path between a relative node representing a relative and a focus node representing the target user. The method includes traversing the path to convert the hierarchical data structure along the path to a relationship text string that comprises a description of relationships along the path in natural language. The method includes generating a plurality of embeddings from the genealogical records, the embeddings including a first set of one or more embeddings generated from the relationship text string and a second set of one or more embeddings generated from the documentation record. The method includes inputting the plurality of embeddings into a generative machine-learning model to generate the genealogical summary of the target user. The method includes causing a graphical user interface to display the genealogical summary, the genealogical summary comprising, in some embodiments, a machine-generated summary describing a relationship between the relative and the target user. In other embodiments, the genealogical summary comprises a summary of life events or details for the ancestor, including what life was like for the ancestor in a particular occupation in a particular time and place. For an ancestor who was a racial or ethnic minority, the genealogical summary may include details about what life was like in said time and place as a member of a disenfranchised group of people and how those people bonded together to support each other. In some embodiments, the genealogical summary may comment on unique aspects of the biographical details available about an ancestor in the ancestor's genealogical tree, including an unusual (for the particular place and time) family size, composition, or occupation(s).

In yet another embodiment, generating a shareable genealogical summary receiving a request to generate a genealogical summary of a target user. The method includes retrieving a time-series genealogy dataset associated with the target user, the time-series genealogy dataset including a plurality of genealogy records structured temporally. The method includes identifying a contextual data instance in the time-series genealogy dataset based on the user request. The method includes determining that the contextual data instance is expandable using out-of-band information. The method includes accessing a historical record related to the contextual data instance, the historical record including the out-of-band information. The method includes constructing a prompt using the contextual data instance, the historical record and the time-series genealogy dataset to input the prompt into a generative machine-learning model to request the generative machine-learning model to generate the genealogical summary. The method includes receiving the genealogical summary from the generative machine-learning model. The method includes causing a graphical user interface to display the genealogical summary.

In yet another embodiment, generating a narrative includes accessing a historical record. The method includes converting the historical record into a structured dataset that is stored on a database. The method includes inputting the structured dataset to a generative machine-learning model to generate a narrative. The method includes causing a graphical user interface to display the generated narrative.

In yet another embodiment, generating context data associated with a genealogy record includes receiving a request to generate context data associated with a genealogy record. The method includes accessing historical records related to the genealogy record. The method includes searching through the historical records for data related to the individual. The method includes generating a plurality of embeddings from the data related to the genealogy record, the embeddings including a first set of one or more embeddings generated from the data related to the individual and a second set of one or more embeddings generated from a family tree data for the individual. The method includes applying the plurality of embeddings into a generative machine-learning model to generate the context data for the individual. The method includes causing a graphical user interface to display the context data associated with the genealogy record.

In yet another embodiment, a method includes receiving data generated by a machine learning model. The method includes inputting the data into the machine learning evaluator model to evaluate the data across one or more predefined categories of potential noncompliance. Evaluating the data across one or more predefined categories of potential noncompliance includes providing a score for each category of the predefined categories for the data, aggregating scores across multiple categories to generate a compound evaluation score, comparing the compound evaluation score to a predetermined threshold of noncompliance, based on the comparison, determining if the data is noncompliant, and generating an indication of the noncompliance of the data. The method includes causing a graphical user interface to display compliant content based on the data and/or an indication of the noncompliance of the data.

In yet another embodiment, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

Figure

FIG. 8C illustrates a structured dataset, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
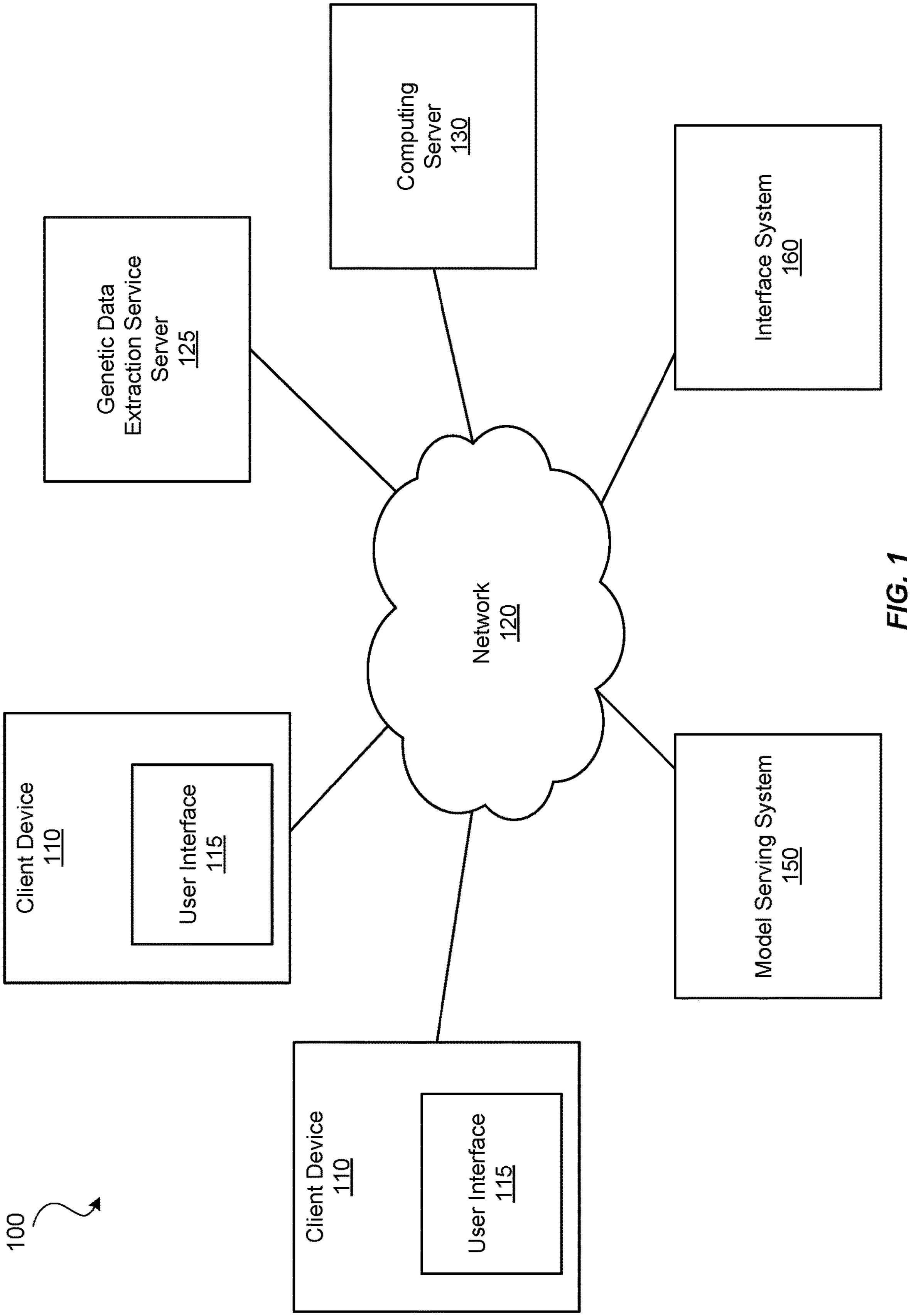
(FIG. 1 illustrates a diagram of a system environment of an example computing system, in accordance with some embodiments.

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP locus. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to provide results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

In some embodiments, language models used by the computing server 130 to analyze genetic data are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many inference tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units (GPUs) for training or deploying deep neural network models. In one instance, the LLM may be trained and hosted on a cloud infrastructure service. The LLM may be trained by the computing server 130 or entities/systems different from the computing server 130. An LLM may be trained on a large amount of data from various data sources. For example, the data sources include websites, articles, posts on the web, and the like. From this massive amount of data coupled with the computing power of LLMs, the LLM is able to perform various inference tasks and synthesize and formulate output responses based on information extracted from the training data.

In some embodiments, a generative machine-learning model may include an LLM such as ChatGPT available from OpenAI LP of San Francisco, CA. In other embodiments, other LLMs, combinations of LLMs, or modifications of LLMs (including fine-tuned instances of LLMs) such as PaLM, BERT, CodeX, LaMDA, Falcon, Cohere, LLAMA, or related or derivative models, may be utilized as suitable. In some embodiments, the LLM may be a LLM trained on a corpus of genealogy data specific to a genealogy research platform.

The model serving system 150 receives requests from the computing server 130 to perform inference tasks using machine-learned models. The inference tasks include, but are not limited to, natural language processing (NLP) tasks, audio processing tasks, image processing tasks, video processing tasks, and the like. In some embodiments, the machine-learned models deployed by the model serving system 150 are models configured to perform one or more NLP tasks. The NLP tasks include, but are not limited to, text generation, query processing, machine translation, chatbot applications, and the like. In some embodiments, the language model is configured as a transformer neural network architecture. Specifically, the transformer model is coupled to receive sequential data tokenized into a sequence of input tokens and generates a sequence of output tokens depending on the inference task to be performed. In the present disclosure, the model serving system may be referred to as a generative machine-learning model, a machine-learning language model, a large language model, etc.

The model serving system 150 receives a request including input data (e.g., text data, audio data, image data, family tree data, genealogic data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In some embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

In some embodiments, the inference task for the model serving system 150 can primarily be based on reasoning and summarization of knowledge specific to the computing server 130, rather than relying on general knowledge encoded in the weights of the machine-learned model of the model serving system 150. Thus, one type of inference task may be to perform various types of queries on large amounts of data in an external corpus in conjunction with the machine-learned model of the model serving system 150. For example, the inference task may be to perform question-answering, text summarization, text generation, and the like based on information contained in the external corpus.

Example Computing Server Architecture

Figure 2:
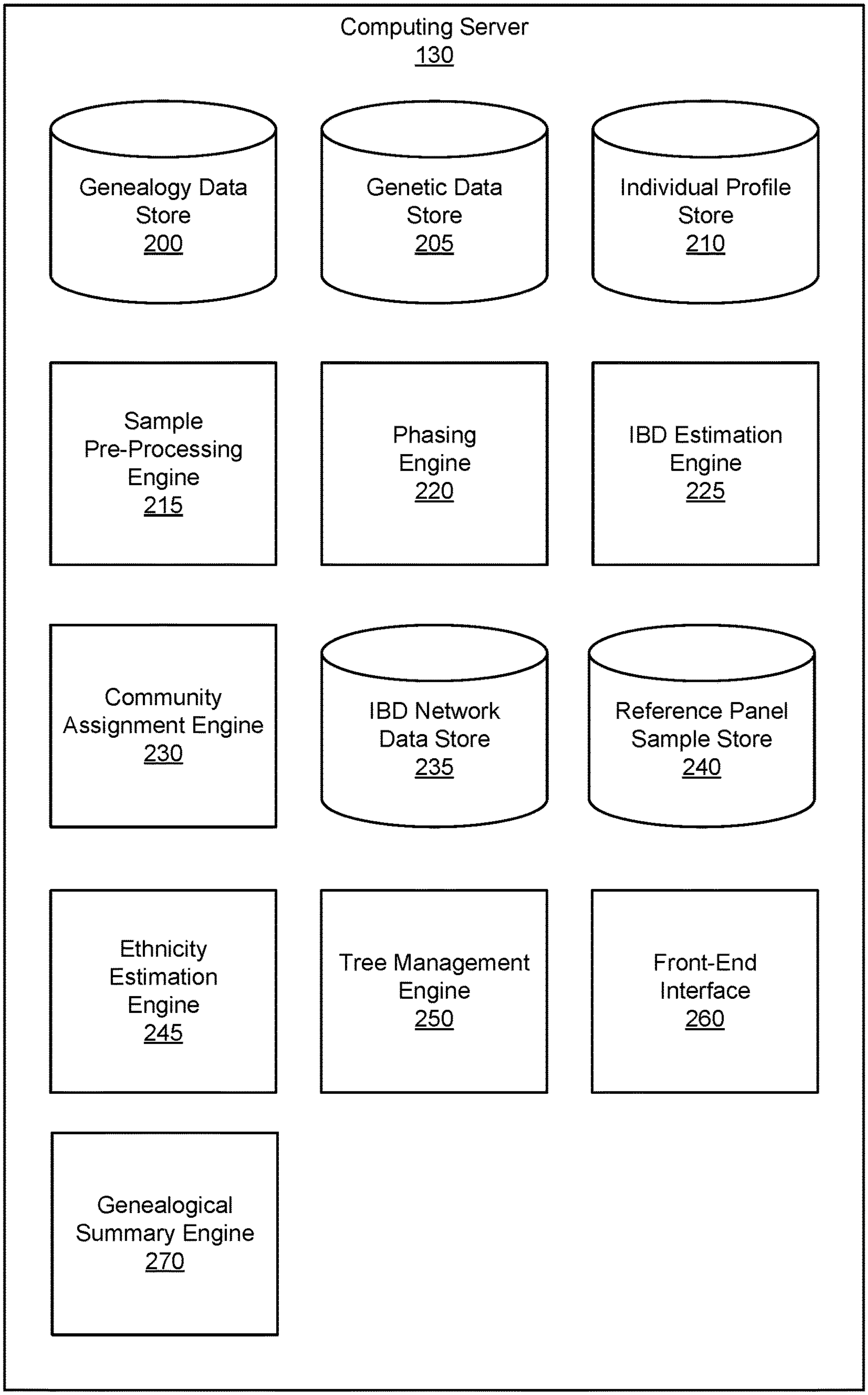
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites) filtered from the sequencing results. A SNP locus that is single base pair long may also be referred to a SNP site. A SNP locus may be associated with a unique identifier. The genetic dataset may be in a form of diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, carlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g. stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and research conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites.

Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing. Other example phasing embodiments are described in U.S. Patent Application Publication No. US 2021/0034647, entitled "Clustering of Matched Segments to Determine Linkage of Dataset in a Database," published on Feb. 4, 2021.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine-learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine-learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine-learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020 and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine-learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

Example System for Generating a Genealogical Summary

Figure 3:
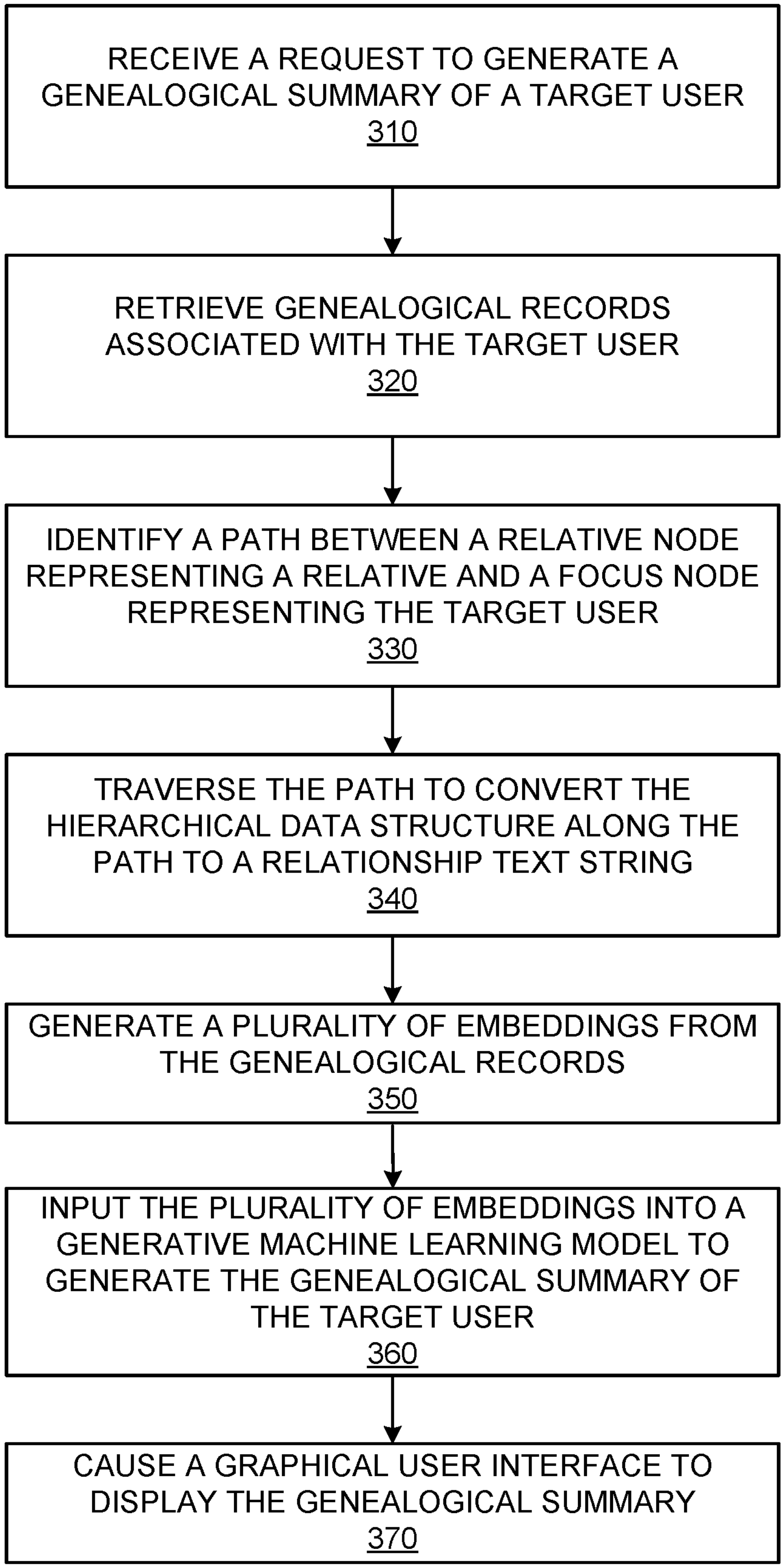
FIG. 3 is a flowchart illustrating an example process for using a machine-learning language model to generate a genealogical summary, in accordance with some embodiments.

FIG. 3 is a flowchart depicting an example process 300 for generating a genealogical summary of a target user based on genealogy records, in accordance with some embodiments. The process may be performed by one or more engines of the computing server 130 illustrated in FIG. 2, such as genealogical summary engine 270. The process 300 may be embodied as a software algorithm that may be stored as computer instructions that are executable by one or more processors. The instructions, when executed by the processors, cause the processors to perform various steps in the process 300. In various embodiments, the process may include additional, fewer, or different steps. While various steps in process 300 may be discussed with the use of computing server 130, each step may be performed by a different computing device.

In some embodiments, the computing server 130 receives a request to generate a genealogical summary of a target user (step 310). The process may be initiated through the user interface 115 of the client device 110 of FIG. 1, where the user inputs their request. User requests may be in various forms, such as text queries, voice commands, or even clicks on interactive elements within the user interface 115. While embodiments in which a user actively requests the creation of a genealogical summary have been described, it will be appreciated that the disclosure is not limited thereto, but rather extends to embodiments in which a request to generate a genealogical summary is generated automatedly by a genealogical research service, for example to drive user engagement by generating summaries for aspects of a user's genealogical tree that do not yet have substantial content, are not yet well-researched, or are not well-engaged with by the user.

For example, the user may enter the following text query in the user interface 115: generate a genealogical summary for Joseph Tello, focusing on the maternal lineage. This request is specific to the maternal lineage for user Joseph Tello. The user may be interested in tracing their mother's ancestral line for personal, medical, or heritage-related reasons. Another specific example of a user request is the following: review the family tree for Maria Medina and identify all members who relocated to the United States before 1900. This user is not only interested in Maria Medina's family tree, but also in documenting migration patterns in the family. The rationale for this request could be to study the family's immigration history or trace the cultural shifts in the family over generations.

Another specific example of a user request may be the following: trace the paternal lineage of Joseph Tello, highlighting any family members who have held public office. This request indicates interest not only in tracing genealogical details, but also in identifying professional achievements within the family. The user may be interested in family fame, potential genetic inclinations toward leadership roles, or perhaps preparing for a lineage-society application. Each request may reflect various factors such as personal interest, exploration of cultural heritage, medical investigations, or even legal matters. Therefore, the present subject matter may provide a versatile tool capable of handling a wide range of genealogical queries.

The client device 110 may convert the user input into a structured data in a specific format (e.g., HTTP request, JSON payload). The structured data may include, among other things, the action to be performed (e.g.: generate a genealogical summary for Joseph Tello focusing on the maternal lineage; review the family tree for Maria Medina and identify all members who relocated to the United States before 1900; or trace the paternal lineage of Joseph Tello, highlighting any family members who have held public office), the user details, and any other relevant information. The client device 110 may send the request structured data to the computing server 130 over the network 120. Upon receipt of the structured data, the computing server 130 may parse the structured data and initiate the steps to generate the requested genealogical summary.

In some embodiments, the computing server 130 retrieves genealogical records associated with the target user (step 320). The genealogical records may include a documentation record and/or a family tree that is arranged in a hierarchical data structure having nodes connected by edges. The computing server may retrieve the genealogical records associated with the target user by identifying the target user by a parameter including name and/or date of birth and/or a place associated with the target user and searching through a datastore to retrieve the genealogical records containing a reference to the identified target user. The unique user identifiers may include a name, a date of birth or any other unique parameter that can be used to search user records within the datastore. The datastore may be any database storing genealogical records. The retrieval process uses the given identifiers and compares them against entries in the datastore to find matching elements.

The genealogical records retrieved may include a family tree and/or documentation record. The family tree may be a hierarchical data structure with nodes (familial members) interconnected by edges (representative of relationships amongst them). Each node may be associated with object identifiers or any other unique parameter for providing easy recognition and retrieval. The documentation record may be or include various types of information related to the target user such as birth certificates, marriage records, death records, census records, military records, images, yearbook entries, or even letters and memoirs providing deeper insight into their lineage. Each documentation record in the datastore may be retrievable by matching metadata or linked identifiers of the record with the target user's identifiers. The computing server may search through this data (i.e., paths in the family tree or family accounts in the documentation record) to identify a genealogical record tracing the familial connections of the target user. This aggregation of data may be used to generate the genealogical summary.

For example, in response to the specific user request 'generate genealogical summary for Joseph Tello focusing on the maternal lineage', the computing server may retrieve genealogical records associated with Joseph Tello. The genealogical records may include various forms of data (e.g., documentation records), such as birth records associated with Joseph Tello's mother (and/or potentially other maternal relatives), marriage certificates (providing details about spouses and their parents), death certificates (which may list the parents' names), and census data (providing details about household distribution, including names, ages, occupations, addresses, and other details). The computing server may also retrieve church records, immigration records, military records, etc. For Joseph Tello's maternal lineage, a documentation record may include his mother's birth, marriage, and death certificates, as well as similar documents for Joseph's grandmother and possibly further maternal ancestors. Joseph Tello's family tree may be divided into nodes and edges. The nodes may correspond to individuals in the family tree. In this case, nodes may correspond to Joseph Tello, his mother, grandmother, and so forth, along the maternal lineage. The edges may correspond to and indicate the relationships between these individuals.

In some embodiments, the computing server 130 identifies a path between a relative node representing a relative and a focus node representing the target user (step 330). The computing server may identify the path between the relative node representing a relative and a focus node representing the target user by selecting a particular relative node and searching through the family tree to identify a path that leads from the focus node to the relative node. The focus node may correspond to the target user, while the relative node may correspond to another familial member who holds a relationship with that user. A relative node may be selected for path traversal. This selection may be made based on factors determined by the context of the user's request and may correspond to any relative in the family tree of the target user.

To process the search for the path that leads from the focus node (target user) to the relative node (selected relative), the server may use various data-structure traversal algorithms. These algorithms, such as depth-first search or breadth-first search, are techniques used to scan through data organized in hierarchical relationships like a family tree. Traversing the family tree, the computing server may process nodes and their interconnections (edges), and search through the tree structure by analyzing from one linked node to another. The path may start from the focus node and navigates across various connections to reach the relative node. The identified path effectively may provide the genealogical relationship between the target user and the relative represented by the nodes.

In the case of the specific request 'generate genealogical summary for Joseph Tello focusing on the maternal lineage', the computing server may identify a path in the hierarchical family tree data structure between the focus node (corresponding to Joseph Tello) and the relative node (e.g., corresponding to Joseph Tello's maternal grandmother). First, the computing server may select the focus node as corresponding to Joseph Tello. Next, the computing server may select the particular relative node (e.g., Joseph Tello's maternal grandmother). To identify the path between these two nodes, the computing server may traverse the family tree, starting from the focus node. It may locate the node corresponding to Joseph Tello's mother in the family tree, marked as a linked node. This relationship may be established by a first edge that connects the nodes corresponding to Joseph and his mother. After that, the computing server may identify a second edge linking the nodes of Joseph's mother to her mother (i.e., Joseph's maternal grandmother). As a result, the identified path may start from the focus node and go to the first edge, then to the linked node, after that to the second edge, and ends up at the relative node.

In some embodiments, the computing server 130 traverses the path to convert the hierarchical data structure along the path to a relationship text string. The relationship text string may include a description of relationships along the path in natural language (step 340). For example, the edges may be utilized to generate a description of the relationship between two particular nodes, as the edges may be labeled or otherwise comprise or be associated with metadata indicating, e.g., a parent-child, spouse, sibling, or other relationship between the two nodes.

Each node may correspond to an individual in the family tree and the edge connecting two nodes may correspond to the relationship between those two individuals. In some embodiments, the computing server may traverse the path node by node from the focus node corresponding to the target user to the relative node corresponding to the particular relative by following the edges representing relationships in the hierarchical structure. The traversal process may start at the focus node corresponding to the target user within the family tree. By following the edges (or connections) that correspond to relationships within the hierarchical data structure, the server may process one node after another along the identified path until it reaches the relative node. As the computing server 130 processes (i.e., goes through) the traversal path, it keeps track of the nodes (individuals) and the edges (relationships) it processes. For example, if an edge connects a parent and child node, the computing server may convert it to "parent of" or "child of" in the text string. The computing server 130 may use mapping rules or algorithms that assign natural language phrases or descriptions to each node and edge in the data structure.

In some embodiments, edges in the family tree may represent a variety of relationships beyond the immediate parent-child connection (e.g., cousins, aunt, uncle, etc.). The server may use mapping rules to convert these relationships into a natural language description. If a path connects two nodes through their parents (implying that these parental nodes are siblings), the computing server may map these two initial nodes as cousins. The natural language conversion might read as "is the cousin of". If a path leads from a node to another node's parent's sibling, the server may identify the end node as the aunt or uncle of the starting node. The generated description may be "is the aunt of" or "is the uncle of", depending on the gender of the relative.

With this process, the computing server may convert a path of nodes and edges within a hierarchical data structure into a coherent, natural language description of relationships, which provides the genealogical information within the family tree. In the case of the specific request 'generate genealogical summary for Joseph Tello focusing on the maternal lineage', as the computing server traverses the identified path, it may simultaneously convert the relationships along the path into a natural language description. For example, moving from Joseph's node to his mother's node may translate into the text string: Joseph's mother is [mother's name]. Continuing from the mother's node to the grandmother's node may result in: [mother's name]'s mother is [grandmother's name].

In some embodiments, the computing server 130 generates a plurality of embeddings from the genealogical records (step 350). The embeddings may include a first set of one or more embeddings generated from the relationship text string and a second set of one or more embeddings generated from the documentation record(s).

The computing server may preprocess the relationship text string and convert each word of the preprocessed relationship text string into a first set of numerical representations. In this step, the relationship text string, which is a natural language description of relationships derived from traversing the family tree, is prepared for conversion into a numerical format. For example, the computing server 130 may preprocess the relationship text string by tokenizing the relationship text string into individual words to reduce words to their root form and/or remove any stop word that does not affect a semantic value of the relationship text string.

The preprocessing may start with tokenization, a process which breaks down the text string into individual words or tokens. This may allow the computing server 130 to process each word in the relationship text string separately. The computing server 130 may process the words to reduce them to their root form (i.e., lemmatization). This step simplifies words to their base or dictionary form (for example, 'running' becomes 'run'), thereby grouping different forms of the same word together. Furthermore, the computing server 130 may process the words to remove stop words. Stop words (such as 'is', 'the', 'and'), which occur frequently in a language but often do not carry significant meaning, are excluded to reduce noise in the data. This process provides a simplified version of the relationship text string that retains its core semantic value.

The computing server 130 may preprocess the documentation record(s) and convert features of the preprocessed documentation record(s) into a second set of numerical representations. For example, the computing server 130 may preprocess the documentation record(s) by extracting features from the documentation record(s). For example, the computing server 130 may extract and select important observable characteristics or attributes from the documentation record(s). These characteristics may take various forms, from simple attributes like names and dates to complex patterns that describe relationships or connections in a genealogy.

The computing server 130 may apply a machine-learned model trained on data similar to the first set of numerical representations to transform them into the first set of embeddings. The embeddings may position the relationship text string's data within the latent space of the machine learning model. Each embedding's position may be determined based on characteristics of the relationship text string's data such that similar data instances (or characteristics) are positioned closer together within the latent space. A discussion of the machine-learned model and embeddings is provided in the present disclosure under the section Machine Learning Models.

The computing server 130 may also apply a trained machine-learned model to transform the second set of numerical representations into the second set of embeddings. The embeddings position the documentation record's data within the latent space of the machine learning model. Each embedding's position may be determined by the characteristics of the documentation records' data such that similar data instances or characteristics are positioned closer together within the latent space. A discussion of the machine-learned model and embeddings is provided in the present disclosure under the section Machine Learning Models.

In some embodiments, the computing server 130 inputs the plurality of embeddings into a generative machine-learning model to generate the genealogical summary of the target user (step 360). Following input, the generative machine-learning model may process the set of embeddings by applying its learned understanding of the patterns, relationships, and trends within the data to generate the genealogical summary for the target user. The generated summary may provide an overview of the target user's genealogical data, offering potentially new insights and interpretations. The genealogical summary may describe a relationship between the relative and the target user. A discussion of the generative machine-learning model is provided in the present disclosure under the section Machine Learning Models.

A genealogical summary may be a comprehensive overview that presents an individual or family lineage, ancestry, and heritage details accumulated from various data sources. The genealogical summary may include familial relationships, migration patterns, important life events, locations of interest, significant dates, and/or pictures or documents. For example, the genealogical summary may provide a thorough understanding and clear visualization of an individual's or family's lineage over multiple generations. The genealogical summary may provide an individual or a family within broader socio-historical contexts. The genealogical summary may include dates and locations, which link personal histories to larger historical events and/or migrations. The genealogical summary may provide detailed insights into geographical origins, ethnic roots, and cultural backgrounds, helping individuals better understand and connect to their heritage. When combined with health data, genealogical summaries may provide preemptive health planning by identifying inherited diseases or conditions prevalent in a family lineage. The genealogical summaries may provide critical tools in legal situations to affirm, for example, familial relationships, inheritance claims, or citizenship status. The genealogical summaries may identify unknown relatives and/or connections, helping extend family ties and relationships.

In some embodiments, in response to the specific user request to 'provide a genealogical summary for Joseph Tello focusing on the maternal lineage', the computing server 130 may process the request to provide the following genealogical summary: "Joseph Tello was born on Apr. 15, 1899, in Newark, New Jersey, USA. His mother, Maria Medina, was born on Jan. 10, 1866, in East Lansing, Michigan. Remarkably, Maria was a pioneer in early childhood education during her time, influencing developmental learning methods still admired and practiced in various parts of Michigan. The maternal lineage traces back to his grandmother, Lucic Thomas. Born on Mar. 30, 1842, in New York, New York, USA, she was known for her tireless efforts in penning down several women-empowerment anthologies, inspiring generations of women to rise against societal norms."

In some embodiments, in response to the specific user request to 'review the family tree for Maria Medina and identify all members who relocated to the United States before 1900', the computing server may process the request to provide the following genealogical summary: "Maria Medina was born on Jan. 10, 1866, in East Lansing, Michigan, USA. She married Jean Tello and had a son, Joseph Tello, born on Apr. 15, 1899, in Newark, New Jersey, USA. Maria Medina was the daughter of Vincent Medina and Lucic Brennan. Vincent Medina was born on May 12, 1830, in Dublin, Ireland, and immigrated to the United States in 1850, settling in Michigan. Maria's mother, Lucie Brennan, was born on Mar. 4, 1834, in Liverpool, England, and relocated to the United States in 1855, also settling in Michigan. Vincent and Lucie had three other children who relocated to the United States before 1900. These include James Medina, born Apr. 2, 1856, William Medina, born Feb. 8, 1858, and Eleanor Medina, born Dec. 22, 1860. All three children were born in Michigan, USA. On Maria's husband's side, Jean Tello was the son of Marco Tello and Maria Gonzalez. Marco was born on Aug. 13, 1828, in Madrid, Spain, and relocated to the United States in 1851, settling in New York. Maria Gonzalez was born on Sep. 3, 1832, in Barcelona, Spain. She moved to the United States in 1853 after marrying Marco and also settled in New York.

In total, the records identify seven individuals directly related to Maria Medina who have relocated to the United States before 1900."

In some embodiments, in response to the specific user request to 'trace the paternal lineage of Joseph Tello, highlighting any family members who have held public office', the computing server may process the request to provide the following genealogical summary: "Joseph Tello was born on Apr. 15, 1899, in Newark, New Jersey, USA. He is the son of Jean Tello and Maria Medina. Joseph's father, Jean Tello, was born on Mar. 14, 1859, in Santander, Spain. After immigrating to the United States in 1875, Jean became a significant figure in the community of Newark, serving as the city's mayor from 1890 to 1898. Tracing further back, Jean's father and Joseph's grandfather, Eduardo Tello, was born on Feb. 26, 1830, in Bilbao, Spain. Eduardo served in the Santander city council for a span of ten years from 1865 to 1875 before his son immigrated to the United States. In the paternal lineage, another figure of public service emerges with Joseph's great-grandfather, Marcos Tello. Born on Apr. 10, 1800, in Seville, Spain, Marcos served as a Justice of the Peace from 1835 to 1850 in his hometown. Finally, at the root of this lineage, Joseph's great-great-grandfather, Don Carlo Tello, born on Jun. 20, 1770, in Valencia, Spain, held the position of a town magistrate in Valencia from 1815 to 1830. In conclusion, it is apparent that Joseph Tello descends from a distinguished paternal lineage notable for public service, including roles such as mayor, city council member, justice of the peace, and magistrate."

In some embodiments, the computing server 130 causes a graphical user interface to display the genealogical summary (step 370). The genealogical summary may include a machine-generated summary describing a relationship between the relative and the target user. The computing server 130 may cause the graphical user interface to display the genealogical summary by packaging the generated genealogical summary in a format suitable for display, transmitting the packaged genealogical summary to the graphical user interface, and upon receipt of the packaged genealogical summary, causing the graphical user interface of a user device to display the genealogical summary.

For example, the computing server 130 may receive the genealogical summary from the generative machine-learning model and package it in a suitable format. This process may include defining the layout, grouping similar data points together, providing color or size variations, and applying other visualization features. Following the packaging, the genealogical summary may be transmitted to the graphical user interface of a client device over a network. The computing server 130 may provide the genealogical summary via the network 120 to client devices 110 to be displayed on their user interface 115. Upon receiving the packaged summary, the graphical user interface 115 may display it to the user.

After the generated genealogical summary is displayed, the computing server 130 may provide a dynamic frontend framework on the graphical user interface. This framework may be designed to allow users to interact with the summary in a meaningful, hands-on manner. Interaction here may include a variety of possible actions like highlighting or selecting specific elements for more information, filtering displayed data based on certain criteria, or even manipulating the displayed summary to view different angles or perspectives. The user may be presented with options for saving the genealogical summary to a profile of a tree node and/or sharing the genealogical summary in suitable channels, such as in a story on their profile, to social media services, via text or email, or otherwise.

In some embodiments, the computing server 130, using a generative machine-learning model, may generate genealogical summaries, in accordance with some embodiments. The process may be performed by one or more engines of the computing server 130 illustrated in FIG. 2, such as genealogical summary engine 270. The process may be embodied as a software algorithm that may be stored as computer instructions that are executable by one or more processors. The instructions, when executed by the processors, cause the processors to perform various steps in the process. In various embodiments, the process may include additional, fewer, or different steps. While various steps in the process may be discussed with the use of computing server 130, each step may be performed by a different computing device.

In some embodiments, the computing server 130 may receive a request from a user to provide a shareable genealogical summary about a target user. The user may enter the request through a user interface 115 on a client device 110. The request includes a request to search for a target user such as a grandparent, parent, great-aunt, or other relative, in accordance with some embodiments. The request may include a relationship to the target user. The request may include a request for certain search results. The search results may include a top 100 results for the target user, including media, stories, historical records, and images. The request may additionally include a request to provide a story about the target user.

In some embodiments, the computing server 130, using a generative machine-learning model, may provide a shareable genealogical summary that includes a genealogical history of the target user. The computing server 130 may use the model serving system 150 to generate the sharable genealogical summary. In some embodiments, the computing server 130 provides the user request to the interface system 160. The interface system 160 may parse the request and provide the request as prompts to the model serving system 150.

In some embodiments, the computing server 130 may provide genealogical information for or about the target user that includes at least a family tree to a generative machine-learning model. The computing server 130 may provide a family tree for or about the target user from the genealogy data store 200. The computing server 130 may also provide a user profile for the target user from the individual profile store 210. The generative machine-learning model may use the data provided by the computing server 130 to generate a response to the user request for a genealogical summary.

In some embodiments, the computing server 130 may receive a response generated by executing the generative machine-learning language model from a model serving system 150. The interface system 160 may receive the output of the generative machine-learning language model. The interface system 160 may construct a summary of the output of the generative machine-learning language model. In some embodiments, the computing server 130 receives the output of the generative machine-learning language model and constructs a summary.

In some embodiments, the computing server 130 may provide the shareable genealogical summary for display to the user. The genealogical summary may be formatted by the interface system 160 for display on a social media platform. The genealogical summary may be in the format of a social media post. In some embodiments, the genealogical summary may be interactive and contain links to articles, records, genealogical trees, or otherwise. The genealogical summary may include marriage certificates, communities, and relevant images of the target user. The genealogical summary may be formatted as a brief narrative for an audience of non-geneticists but with accessible insights into ancestral information and genetics. The genealogical summary may be provided to client devices 110 to be displayed on their user interface 115. The summaries may be one-click shareable or savable.

In some embodiments, an AI avatar presents the genealogical summary through a user interface 115. The AI avatar may be an interface (e.g., a user interface) between the system and the user. For example, the AI avatar may provide the generated genealogical summaries to the user through a designated interface. The AI avatar may provide contextual information in addition to the genealogical summary. In one example, the genealogical assistant provides contextual guidance for records such as Census documents. The AI avatar informs the user that "individuals in this zip code at this time had a median income of X," "X % of people in this state were also engaged in this profession," and other contextual information.

The AI avatar may advantageously be configured to provide an iterative interaction with a user. As described in some embodiments relating to FIG. 6 and the associated description, the AI avatar may suggest follow-up prompts to a user in response to a particular user prompt and generated response. Continuing with the example above of a user request 'provide a genealogical summary for Joseph Tello focusing on the maternal lineage,' the AI avatar may, after a response is generated and displayed, further prompt the user by suggesting follow-up prompts including, e.g., 'tell me more about Maria's pioneering work on early childhood education,' 'what was life like for Spanish immigrants to the US during this timeframe,' etc.

In one example, a user requests a genealogical summary about an ancestral French bulldog. The AI avatar impersonates a French bulldog and acts like a French bulldog. The AI avatar may converse by saying "I love visiting Central Park" if the ancestral French bulldog lived in New York City. The AI avatar may even have associated audio of a French bulldog's signature strained breathing in order to create an immersive dialogue experience for the user. The genealogical assistant, meanwhile, is able to conduct a multi-modal search based on the ancestral French bulldog. The user profile of the owner of the ancestral French bulldog is pulled from the individual profile store 210. In addition, external databases may be searched for historical and cultural information about communities, regions, and descriptions of the French bulldog breed at the time of the ancestral French bulldog's life. Results of the searches are provided to the model serving system 150 to generate a genealogical summary of the ancestral French bulldog's life and experiences.

Intelligent Genealogical Assistant

There is a knowledge gap between users of a genealogical database and professional genealogists. It is difficult for the majority of users of an online genealogical database to effectively find information and determine relationships between historical individuals and current users. There is also a significant difference between how older users of an online genealogical database and younger users work. Younger users tend to have an expectation for the online genealogical database to know what they want. To address these issues, a smart virtual assistant, referred to herein as a genealogical assistant, may be used to communicate with customers using natural language abilities and generate a genealogical summary of a customer based on genealogy records.

The genealogical assistant may be a personified system that communicates with customers using all of the internal capabilities of the network 120. All the internal capabilities may only be known to expert genealogists, but the genealogical assistant is used to simplify all of those capabilities for use by non-expert users of the genealogical database. The genealogical assistant is a personable, artificial professional genealogist tuned specifically for users.

Figure 4:
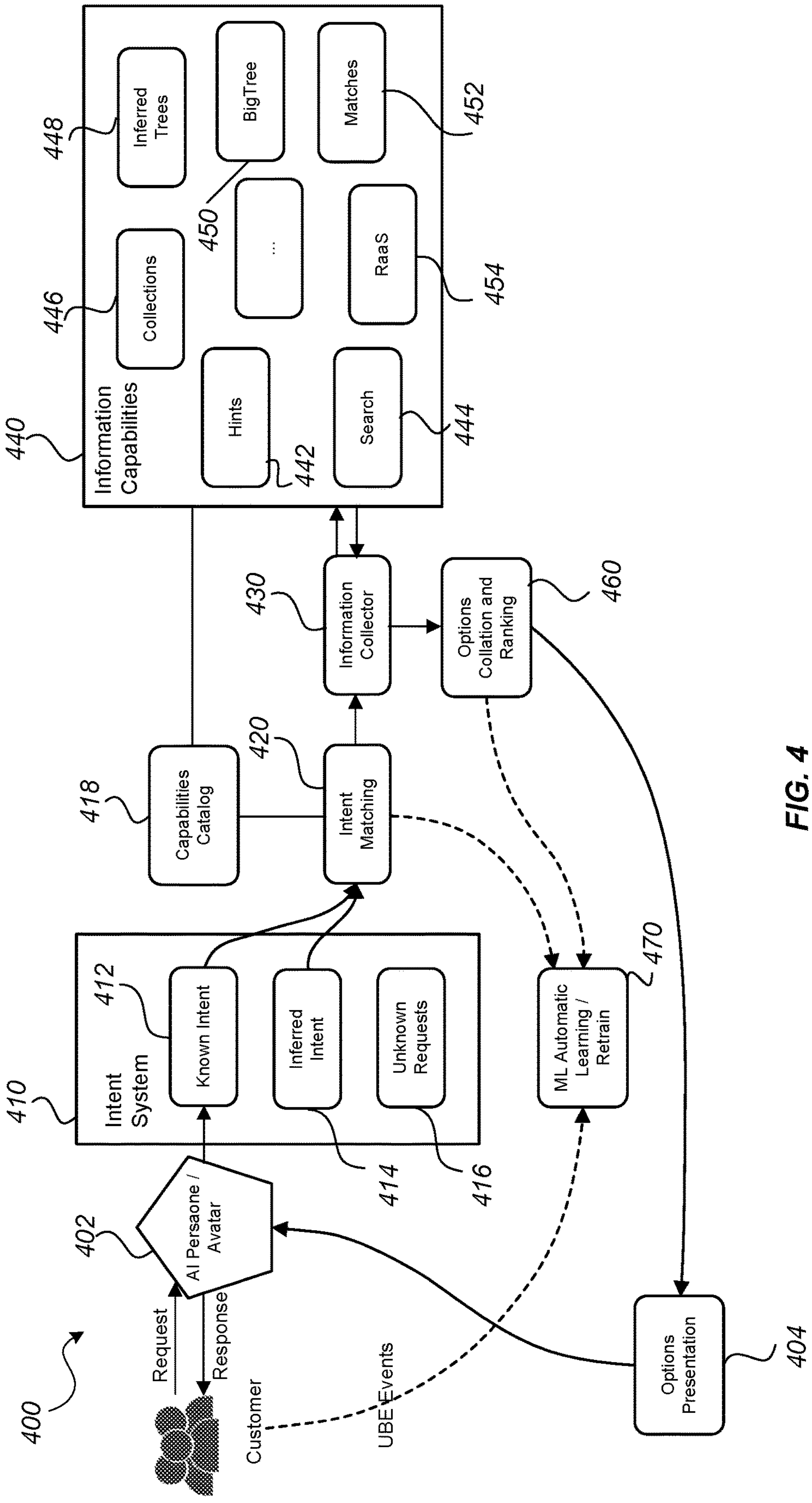
FIG. 4 is a block diagram of an example system for generating genealogical summaries, in accordance with some embodiments.

An example high-level implementation of the genealogical assistant 400 is illustrated in FIG. 4. As shown, the genealogical assistant 400 includes various interconnected modules and systems which work together to process and respond to a user's requests. An AI persona module 402 receives requests from users and communicates responses. It interacts with an intent system 410 for request processing and relays results from an option presentation system 404 to the user. The intent system 410 includes three modules: a known intent module 412, an inferred intent module 414, and an unknown request module 416. The known intent module 412 can handle requests that match pre-established patterns understood by the system, e.g., the genealogical assistant 400, the computing server 130, or otherwise. The inferred intent module 414 can use machine learning to decipher user intent from less straightforward or novel user requests. The unknown request module 416 can handle requests that the system fails to parse and saves them for future machine learning training for system improvement. The intent matching system 420 can take the output from the intent system 410, interpreting and translating it into actionable queries that can be understood by the information collector 430.

The information collector 430 can collect data, in response to queries, generated by the intent matching system 420. It may do so by communicating with the various modules within an information capabilities system 440.

The information capabilities system 440 includes various modules: hints 442, searches 444, collections 446, inferred trees 448, big tree 450, matches 452, and RaaS 454 (Research as a Service). Each of these modules has a specific function related to data retrieval or analysis. The hint module 442 can provide genealogical-research tips or guidance based on user inquiries, relevant genealogical data, and analysis done by the system so as to facilitate user discoveries and unblock user research. The searches module 444 can manage the execution of detailed searches across available genealogical databases, based on the query provided by the user. The collections module 446 can collect, segment, and organize genealogical data from various sources into accessible collections for easy user navigation and/or manage interactions with preexisting collections of records. The inferred trees module 448 can use machine learning techniques to analyze, understand the structure of, and identify potential gaps in a user's family tree to supplement missing (or uncertain) information. The big tree module 450 can aggregate and analyze genealogical databases to establish ancestral lineages to provide context for individual family trees and/or cooperate with a cluster database representing consanguinity of like nodes in different genealogical trees, thereby linking distinct genealogical trees and resolving like entities together for consolidated tree-person and record searching and hint generation. The matches module 452 can identify potential matches between the user's genealogical data and available information to provide suggestions based on similarities or connections and/or potential matches between a user's genetic data and genetic data of other users. The RaaS module 454 can provide dedicated services for research into specific areas of genealogy based on user requests.

An options collation and ranking system 460 can communicate with the information collector 430 and the information capabilities system 440 to order and prioritize results based on relevance and likely success. The option presentation system 404 can format and present the options from the options collation and ranking system 460 to the user through the AI Persona Module 402. The machine learning module 470 can receive data from the intent system 410, the intent matching system 420, the options collation and ranking system 460, and the user for further training and system improvement.

In some embodiments, the genealogical assistant may consolidate all the known tools and techniques behind or into a single system so that all available systems are more available and recommended to users. The genealogical assistant uses machine-learning techniques to understand a user's requests and needs. The user's requests and needs are transformed into internal queries against all of the available systems in the genealogical database. The genealogical assistant may rank and present the results back to the user in a simplified form.

In one example embodiment, a user talks or otherwise communicates with the genealogical assistant using natural language and describes what they would like to do. The genealogical assistant begins with a common set of known or expected customer needs and uses this set to respond to the user. In cases where the user's request is unknown, the user's intent is determined through machine-learning. If the user's request is unable to be matched by the genealogical assistant to a known request, the request is logged for machine-learning training and heuristics work to improve the genealogical assistant's future responses.

The genealogical assistant may interact through dual modalities. In one example, the genealogical assistant may receive user requests through voice and text and respond through voice and text. This is useful for situations where a user may be driving or walking and cannot provide or read text from the genealogical assistant. In such a case, the user may use only the voice mode for the genealogical assistant. The genealogical assistant could additionally receive voice input from a user and provide displays including rich visual information in response. Dual modalities may also be useful in situations with differently abled users, such as those who are not able to see a graphical user interface.

In one example embodiment, user interactions with the genealogical assistant follow the path depicted by FIG. 4. The user interacts with an artificial intelligence (AI) avatar 402 through the user interface 115. The user can ask a question such as "Can you help me find my great grandfather?" Through the intent system 410, the genealogical assistant 400 determines information about the type of request the user provided. The chain of systems includes the known intent, inferred intent, and unknown request systems 412, 414, 416. Each system is a machine-learning system including hand-entered code. The determined inference from each system is used in conjunction to create intent determinations. In the case of great grandfathers, the intent system 410 knows that there are multiple great grandfathers, and the genealogical assistant 400 may determine that there is a specific great grandfather for which the customer has no information using the genealogy data store 200. For example, the genealogical assistant 400 can determine if there are great grandfathers missing from the user's family tree. If the user's request is still unclear, the intent system 410 is programmed to prompt for further information. The intent system 410 might ask "Do you mean your grandma Jones's dad?" The intent system 410 may use natural language processing to infer the user's intent and use situations where the customer is not understood to automatically produce data for improved machine-learning training. Using the genealogy data store 200 and individual profile store 210, the inferred trees system 448 automatically understands the structure of a user's family tree and knows where data is missing. The genealogical assistant 400 may see that the user is requesting information about missing data from the inferred trees system 448. Such a user request is called a "search for negatives," data that only appears in the relationship between entities connected through a missing element.

After the user's intent is understood, the capabilities catalog 418 is used to match the intent with potential information sources. The genealogical assistant 400 knows through other heuristic and machine-learning systems which information systems are most likely to provide the type of information that the user is seeking. The information collector 430 then queries these systems in parallel to fetch all the information that is appropriate for the request. Entity interference can be used to take the known intent of the user's request and combine it with other information that is already available. A rich query may then be produced to increase the odds of finding the desired information. The genealogical assistant can create a multi-modal search extending beyond the genealogical database to external resources.

In various embodiments, the functionalities and components described in FIG. 4 may be distributed among computing server 130, a machine learning model, and an interface system (e.g., AI persona module 402). For example, in some embodiments, any NLP tasks may be performed by the machine learning model, including analyzing the intention, and providing a response. In some embodiments, the computing server 130 may perform the intent inference and provide the inferred intent to the machine learning model to generate responses. In some embodiments, the computing server 130 may provide data of genealogy data store 200 and individual profile store 210 to the interface system as training data and response data on which the machine learning model is based.

After data has been collected, the data is collated, sorted, and ranked using machine-learning to determine the greatest likelihood of success and provide feedback to the user. The AI avatar 402 works with the information returned to have a conversation with the user of a client device 110. The avatar goes through different options, collecting data about which ones are appropriate and which are not, and utilizes user feedback to future refine searching and maintaining context.

Various types of data may be collected from by genealogy database. Much as a genealogist would pursue non-obvious paths in a genealogical database, the genealogical assistant may combine apparently unrelated data into a single context for correlation. The genealogical assistant may not require user input to initiate a request. The genealogical assistant may find an active node in the genealogy database and begin connecting data on behalf of the user. This feature helps the genealogical assistant to provide searches, trees, hints, collections, matches, inferred trees, stories, story generation, guidance on tools, and guidance on information sources.

In some embodiments, the genealogical assistant uses natural language processing to perform free-text searches.

The genealogical assistant suggests advanced search when necessary or determines that it can find results. In this way, the genealogical assistant helps users to search for the information they are seeking with the right tools. The genealogical assistant may take a simple search provided by the user and expand it into a complex search without needing to notify the user or request further user input. The genealogical assistant can perform sentiment analysis on every human-AI interaction to improve the AI avatar. The genealogical assistant can provide a display including the skills and capabilities that the genealogical assistant has based on the systems available to it. Similarly, the genealogical assistant can provide information including the tasks that the genealogical assistant is able to do for the user. The genealogical assistant may additionally provide hints for the user, email interactions, and assist in customer support questions.

In some embodiments, the genealogical assistant provides human-in-the-loop integration. A human may supervise an interaction and decisions made by the AI avatar in real-time or using a play-back mechanism. The human may provide input flagging certain decisions as wrong and certain as correct or insightful. This feedback allows for an improved automatic training mechanism. In some embodiments, the human providing input may be the user interacting with the AI avatar through the user interface 115. The user may press buttons on every interaction of the conversation to provide feedback.

In some embodiments, the AI avatar has optional displays for the user interface 115. The old timer avatar has a male and a female option, at least. The AI avatar additionally has new-age, traditional avatars. Alternatively, the AI avatar is faceless but still informative and interactive. The AI avatar could be a comic, in a comic-strip style. The genealogical database interface can change based on the AI avatar. For example, the old-timer avatar can turn the genealogical database on the user interface 115 black and white. In one example, the avatar can be a caricature of one of the user's ancestors. The AI avatar can be disabled altogether.

Example System for Generating a Life Story Context Enrichment

Figure 5:
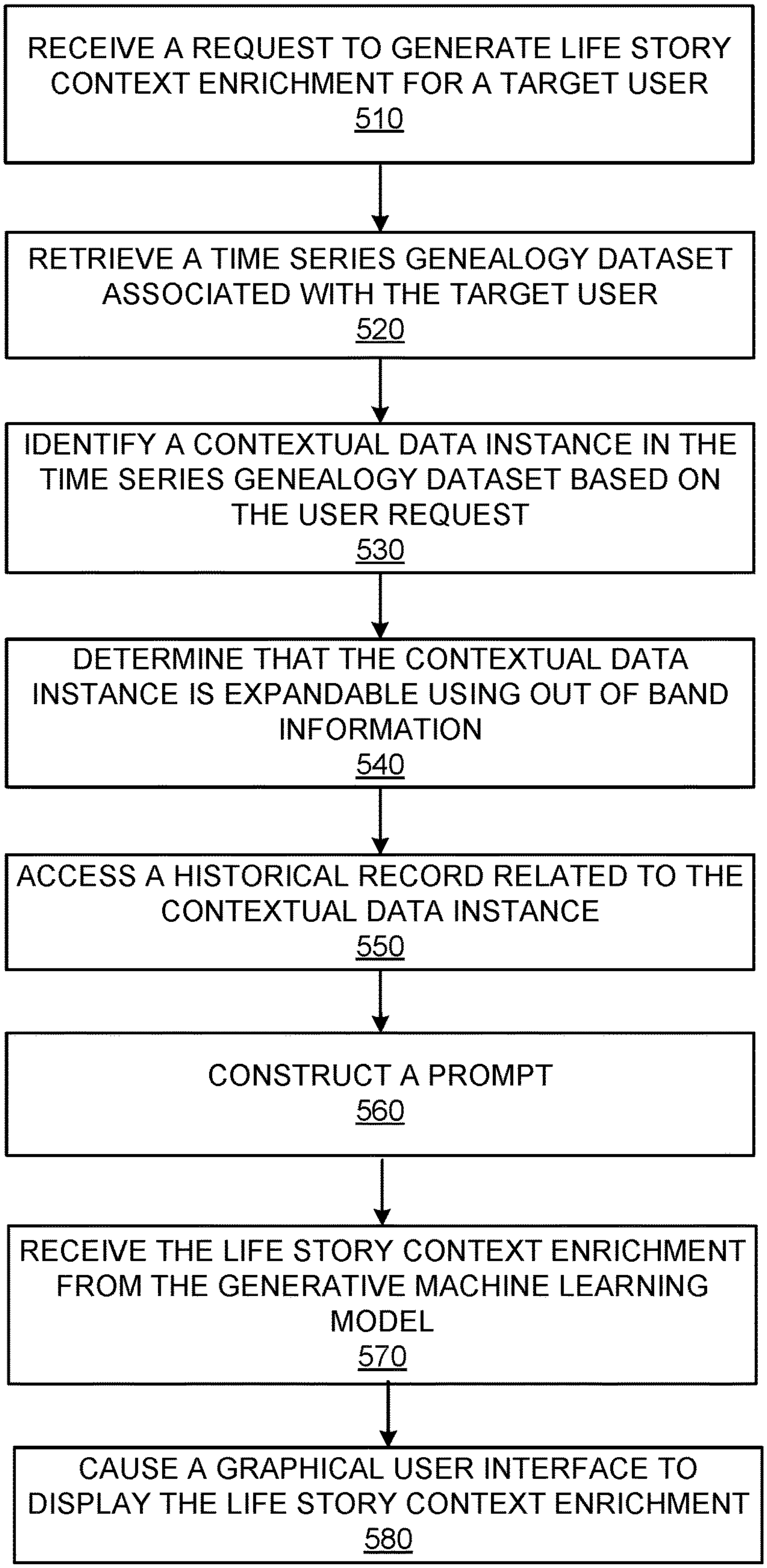
FIG. 5 is a flowchart illustrating an example process for using a machine-learning language model to generate a life story context enrichment, in accordance with some embodiments.

FIG. 5 is a flowchart depicting an example process 500 for generating a life story context enrichment for a target user based on genealogy records, in accordance with some embodiments. The process may be performed by one or more engines of the computing server 130 illustrated in FIG. 2, such as genealogical summary engine 270. The process 500 may be embodied as a software algorithm that may be stored as computer instructions that are executable by one or more processors. The instructions, when executed by the processors, cause the processors to perform various steps in the process 500. In various embodiments, the process may include additional, fewer, or different steps. While various steps in process 500 may be discussed with the use of computing server 130, each step may be performed by a different computing device.

In some embodiments, the computing server 130 receives a request to provide a life story context enrichment for a target user (step 510). For example, as previously mentioned, the client device 110 may send the request to the computing server 130 over the network 120. The user may enter the following text query in the user interface 115: provide a life story context enrichment for my grandfather, Patrick Thomas, who lived in New York during the 1940s. In some embodiments, the computing server 130 may generate the life story context enrichment automatedly, without a user entering the above prompt, or based on any similarly intended prompt. For example, the user may simply prompt "tell me more about my grandfather Patrick Thomas." The computing server 130 may be configured to generate such a life story context enrichment for any tree node or person profile.

In some embodiments, a story may be a narrative constructed from various data points and records about an individual's familial history or an ancestor's life. The story may provide greater context to relationships, events, personal histories, and experiences across generations. A life story may be updated and enriched as new details or insights come to light. The life story may be dynamic and interactive, based on historical data and/or personal records. It may also be enriched by contextual elements.

A life story context enrichment may provide context to a user's genealogical story, expanding it beyond a basic linear narrative or mere data points. The life story context enrichment may include multidimensional data, including genealogy records and a wide variety of other records, such as passport photos and marriage certificates among others. The life story context enrichment may provide a deeper understanding of the story (or history) being explored. The life story context enrichment may goes beyond simply revealing lineage details. Instead, the life story context enrichment may provide a detailed summary into an ancestor's life experiences, journeys, and the significant events of their eras. This enrichment provides users to perceive their family histories not as a series of disconnected, static data but as a comprehensible, engaging narrative. With its capacity for regular updates, the life story context enrichment tool may encourage users to continually use it for potential new discoveries or details about their ancestry.

In some embodiments, the computing server 130 retrieves a time-series genealogy dataset associated with the target user (step 520). The time-series genealogy dataset may include a plurality of genealogy records structured temporally.

A time-series genealogy dataset may be a structured compilation of genealogical records, arranged in a time-defined sequence. This chronological organization may provide the basis of a timeline that is used as one of the primary axes in the dataset. The dataset may include a wide array of genealogical data, including but not limited to, birth records, marriage certificates, employment records, migration records, census records, and death records. Each record may correspond to specific events in time, providing temporal markers for the dataset's temporal structure. Organizing the data in this manner provides for a sequential understanding of genealogical information. While genealogical records have been described, it will be appreciated that the disclosure is not limited thereto or even wholly dependent thereon; rather, the life story context enrichment may be generated on the basis of non-record-specific details about a person. For example, a person may enter a node in their family tree for their grandparent on the basis of details that they personally recollect, including a birth date, a birth place, a marriage date, a marriage place, a death date, a death place, and/or names of relatives such as parents, siblings, spouses, children, etc. The life story context enrichment may be generated solely on the basis of such user-generated details even in the absence of historical records. In embodiments, life story context enrichments may be generated using a combination of different data types associated with tree persons, including user-uploaded details or media (including family photos), historical records, or otherwise.

To create a story, the computing server may collect genealogical records such as birth, marriage, employment, migration, and death records (among others), each associated with time stamps and/or familial connections. The computing server may organize the collected records into a time-series genealogy dataset. The dataset may represent the genealogical information in a chronological structure, for example, by arranging it along a time-based axis. Each record may be a data point placed in temporal context. Within this chronological structure, each data point may correspond to an event or milestone.

The computing server may retrieve the time-series genealogy dataset associated with the target user by communicating with a genealogy database that holds detailed genealogical records organized as temporal structures, searching in the genealogy database to locate genealogy data linked with the target user, and compiling the genealogy data linked with the target user into a dataset including genealogical records that are temporally structured.

For example, the computing server may connect to a database that stores genealogical records organized according to a temporal structure. This arrangement may provide historical and/or genealogical data with a chronological reference. The computing server may search the database to locate genealogy data that is linked (or associated) to the target user. After relevant data is found, the computing server may compile the located genealogy data related to the target user into an organized dataset. The dataset may include genealogical records structured temporally. The dataset may contain time-series data that presents the target user's genealogical information in a suitable format.

In some embodiments, the computing server 130 identifies a contextual data instance in the time-series genealogy dataset based on the user request (step 530). The computing server may identify the contextual data instance in the time-series genealogy dataset by defining a structure to handle the user request and determining searchable parameters based on the defined structure and executing a search of the determined parameters on the time-series genealogy dataset to identify contextual data instances that contains the searchable parameters.

For example, the computing server may define a data structure for processing user requests. The data structure may provide a framework for extracting meaningful data from the genealogy dataset. Following structure definition, the computing server may determine and/or extract searchable parameters. These parameters may be based on the defined structure or may be specific to a user's request. After the searchable parameters are determined, the computing server may search the time-series genealogy dataset to locate and identify contextual data instances within the dataset that contain these parameters. This search may use the defined parameters and the set data structure.

In some embodiments, the computing server 130 determines that the contextual data instance is expandable using out-of-band information (step 540). "Out-of-band information" may correspond to additional, supportive data that is not found within the genealogy records of the target user but can be sourced from other sources, including external databases. The external databases may include historical records, public records, or other genealogical data sets not originally included in the time-series genealogy dataset of the target user.

The computing server may determine that the contextual data instance is expandable using the out-of-band information by defining one or more features of an expandable data instance, checking whether the defined features are found in the contextual instance data, testing the data instance for potential expansion by querying external databases to fetch the out-of-band information, and marking the data instance as expandable based on the testing.

For example, the computing server may define one or more features of the expandable data instance. This definition may provide a benchmark to determine if a given data instance has additional detail or insights. After these features are determined, the computing server may check if the defined features are present within the contextual data instance. For example, the computing server may process the contextual data instance to analyze whether it contains additional relevant information. To search for potential expansion, a computing server may query external databases for out-of-band information. Out-of-band information may correspond to information that is not directly included in the initial dataset, but is stored in alternative data sources and relevant to the context. Based on the result of the querying and testing step, the computing server may mark the data instance either as expandable or not.

In some embodiments, the computing server 130 accesses a historical record related to the contextual data instance (step 550). The historical records can include location records, employment records, historical event records, and/or identification records. The historical record may include the out-of-band information. The computing server may access the historical record related to the contextual data instance by: determining a type of historical records that align with the contextual data instance; upon identifying the historical record type, communicating with a data store that manages the identified type of historical records; and retrieving the historical record that relates to the contextual data instance from the data store.

For example, the computing server may determine the type of historical records that align with the contextual data instance by processing and querying the data instance to identify relevant parameters (or features). These parameters may provide information about the relevant types of historical records. Potential types could include location records, employment records, historical event records, or identification records, among others. After the specific type of historical record are identified, the computing server may connect to a data store that contains the relevant type of historical records. Based on the identification of the historical record type, the computing server may retrieve the historical record related to the contextual data instance. For example, the computing server may extract specific historical records from the data store that align with the previously identified contextual data instance. The computing server may extract these historical records from the data store for further processing.

In some embodiments, the computing server 130 constructs a prompt using the contextual data instance, the historical record and the time-series genealogy dataset to input the prompt into a generative machine-learning model to request the generative machine-learning model to generate the life story context enrichment (step 560). The computing server may construct the prompt by integrating the contextual data instance, the information derived from the historical record and the time-series genealogy dataset, generating the prompt in a format associated with the generative machine-learning model, and inputting the prompt into the generative machine-learning model.

The computing server may integrate the contextual data instance, the information derived from the historical record and the time-series genealogy dataset by: identifying shared parameters between the contextual data instance, the information derived from the historical record and the time-series genealogy dataset; formatting each of the contextual data instance, the information derived from the historical record and the time-series genealogy dataset to a common structure so they can be easily integrated; and merging the contextual data instance, the information derived from the historical record and the time-series genealogy dataset based on the formatting and the shared parameters.

To provide effective integration, the computing server may identify shared parameters across the three components: the contextual data instance, the historical record and the time-series genealogy dataset. These shared parameters may provide linking threads, connecting the different components together. For example, the shared parameters may be based on a type of information, timelines, geographical locations or persons, among other factors. After these shared parameters are identified, the computing server may format each data type (the contextual data instance, information from the historical record and part of the time-series genealogy dataset) into a common structure. This common structure may provide seamless integration and a uniform blueprint that minimizes discrepancies and misalignment. The computing server may merge the reformatted contextual data instance, historical information, and temporally structured genealogical dataset based on the shared parameters. The result of this merge may be a well-structured and user-specific prompt. The prompt may be inputted into the generative machine-learning model. A discussion of generative machine-learned models is provided in the present disclosure under the section Machine Learning Models.

In some embodiments, the computing server 130 receives the life story context enrichment from the generative machine-learning model (step 570). For example, the computing server may receive, from the generative machine-learning model, a machine-generated enrichment summary of the contextual data instance and a machine-generated summary of the time-series genealogy dataset. The machine-generated enrichment summary of the contextual data instance may correspond to an expanded narrative or graphical representation of the specified contextual data. The machine-generated summary of the time-series genealogy dataset may provide a comprehensive overview of the target user's genealogical history ordered in chronological sequence and a general but insightful perspective of the user's lineage and historical evolution.

In some embodiments, the computing server 130 causes a graphical user interface to display the life story context enrichment (step 580). The computing server 130 may cause the graphical user interface to display the life story context enrichment by packaging the generated life story context enrichment in a format suitable for display, transmitting the packaged life story context enrichment to the graphical user interface, and upon receipt of the packaged life story context enrichment, causing the graphical user interface of a user device to display the life story context enrichment. The computing server may provide a dynamic frontend framework on the graphical user interface to allow interaction with the life story context enrichment. Similar steps were described in relation to step 370 of FIG. 3.

In some embodiments, in response to the specific user request to 'provide a life story context enrichment for my grandfather, Patrick Thomas, who lived in New York during the 1940s', the computing server may process the request to provide the following life story context enrichment: "Upon Patrick Thomas's birth in 1910 in Ireland, his family immediately recognized he was an insightful child, full of curiosity. Moving to New York in 1930 to seek better opportunities, Patrick saw himself at the heart of the American Dream amidst the Great Depression, where he hustled along with the vibrant city, looking for ways to make ends meet. In the early 1940s, your grandfather, Patrick, served as a proud American soldier in World War II, after the infamous attack on Pearl Harbor. His letters of correspondence, primary source materials maintained at the National Archives, reveal the depth of his dedication and the maturity of his insights into the unfolding war. Post-war, Patrick returned to a transforming New York, evolving due to the post-war economic boom. The Census documents from 1950 show him living in Brooklyn with his wife, Alice, and their two children. He worked as a postman, a critical role in a time where letters were the primary mode of long-distance communication. Preserved family photos from this period illustrate a well-knit family, vivacious children in parks, joyous holiday celebrations, and Patrick, the devoted father and loyal husband. His journey reveals a fascinating timeline that was a part of, and shaped by, critical historical events."

Genealogical Summary Tool

Figure 6:
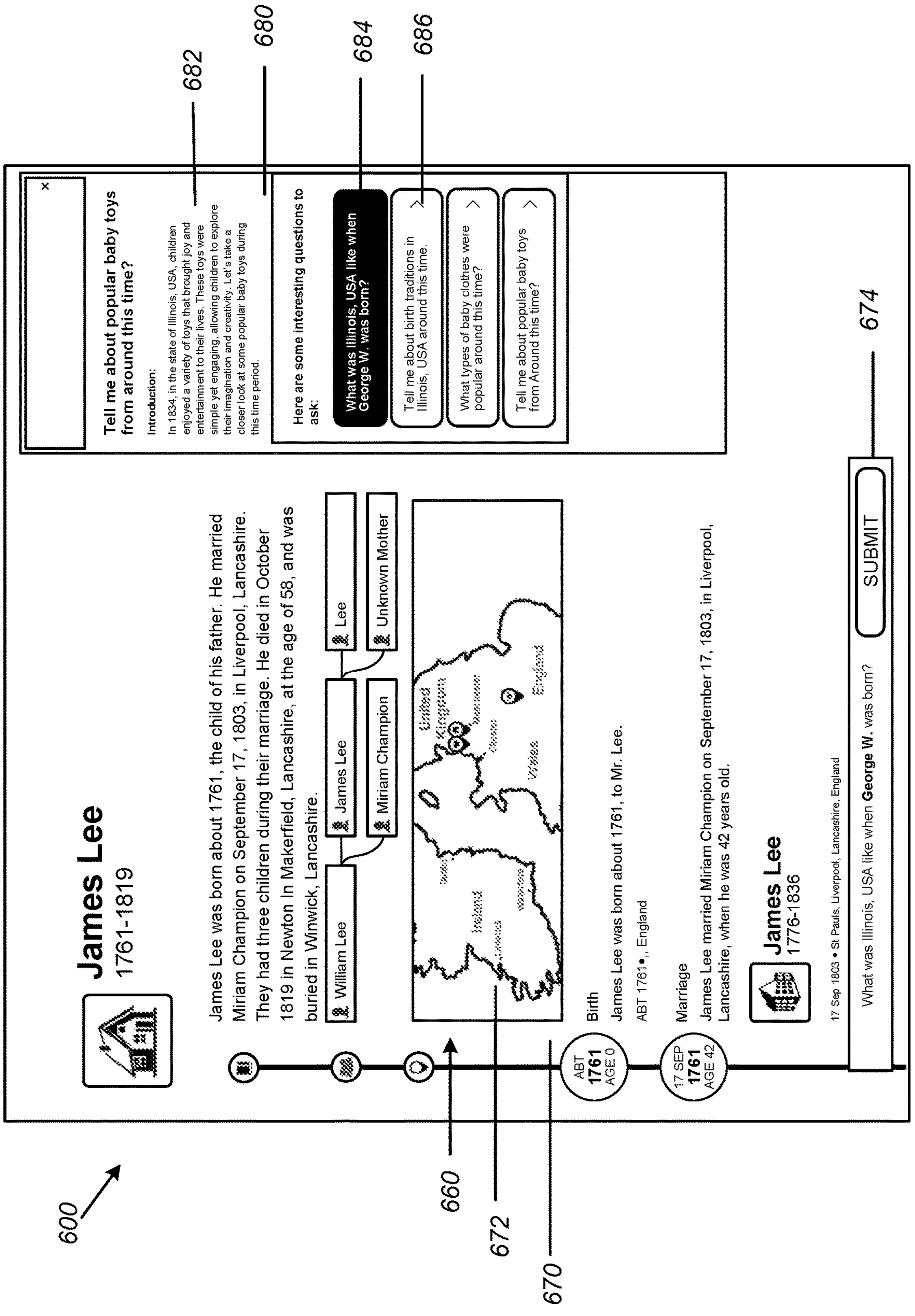
FIG. 6 illustrates a user experience of a genealogical summary interface, in accordance with some embodiments.

Turning now to FIG. 6, a user experience of a genealogical summary tool 600 is shown and described. As seen in FIG. 6, the user experience 660 may include a life story component 670 comprising one or more features 672, such as a timeline, a personalized map, a pedigree chart, summaries regarding facts about a person's life (including birth, marriage, death, military service, or residence information, for example), or other suitable features. A feature 672 of the life story component 670 may include a generative machine-learning model 674, which may include a button and/or indicium whereby a user may be prompted to consult the generative machine-learning model for information, for example in response to a posited question, such as "What was Shizuoka, Japan like when Heijiro Harry was born."

The generative machine-learning model 674 may be located within a single location in the life story component 670, or at multiple places, such as within individual sections thereof. For example, the generative machine-learning model 674 may be incorporated proximate to a section of the life story component 670 corresponding to a birth event, proximate to another section of the life story component 670 corresponding to a residence event or location, proximate to another section of the life story component 670 corresponding to a marriage event, proximate to another section of the life story component 670 corresponding to a death event, proximate to another section of the life story component 670 corresponding to a military service event, or otherwise as suitable. One or more of the above-mentioned events may correspond to a specific feature 672 of the life story component 670 and/or may correspond to a particular record or records in a genealogical database.

After a user clicks on a button of the generative machine-learning model 674, a generative AI interface 680 may be presented to the user. While the above example shows the generative AI interface 680 as a side panel, it will be appreciated that the disclosure is in no way limited thereto; rather, the generative AI interface 680 may be presented in any suitable manner, such as via a pop-up interface, a drop-down interface, or otherwise as suitable. The generative AI interface 680 may include a response section 682 where a response to a prompt is provided. In some embodiments, the prompt, in the form of a question about a pertinent or corresponding detail of a person's life, is shown in the generative machine-learning model 674 within the life story component 670. In the above example, the question regards a time- and location-specific context in which a person corresponding to the life story component 670 is noted to have been born.

The response section 682 is shown in the above example as including a text-only response to the question in the generative machine-learning model 674, but it will be appreciated that the disclosure is not limited to text-only responses, but rather may include images, videos, combinations thereof, or any other suitable format of response as suitable. The generative AI interface 680 may include one or more additional predetermined prompts 684, shown as selectable buttons, for a generative-AI response. The prompts 684 may include one or more indicia 686 for indicating to a user which prompts have been selected already, allowing a user to advance through a slate of predetermined prompts to generate multiple facets of additional information pertaining to aspects of a person's life. In some embodiments, such as the above example, the indicia 686 include carets vs. checkmarks and different colors within the prompts 684; in other embodiments, the indicia 686 may take any suitable form and function. The responses to the selected additional prompts 684 may likewise be presented to the user in the response section 682 or may correspond to additional, individual response sections as suitable.

The generative AI interface 680 may provide options for saving, sharing, editing, regenerating, concatenating, or otherwise interacting with the generated responses. A genealogical research service may, in some embodiments, generate hints for other users based on the generated content. In some embodiments, the generative AI interface 680 may rely on a combination of person-specific records, data, images, and other details in addition to public information on which the generative AI model is trained to generate responses, allowing for highly personalized and detailed contextual responses. In some embodiments, the generative AI interface 680 may provide users with a history of prompts and responses. In yet other embodiments, the generative AI interface 680 allows users to enter free-form text prompts.

While four additional prompts 684 are shown, it will be appreciated that any number or type of additional prompts 684 are contemplated. The generative AI interface 680 may be opened specifically for a single instantiation of a generative machine-learning model 674, such as the generative machine-learning model 674 which corresponds in the above example to a birth event, with additional generative AI interfaces 680 generated for additional generative machine-learning model 674 in the life story component 670 as suitable; alternatively, a single generative AI interface 680, instantiated as a side panel, may correspond to a plurality of generative machine-learning model 674, with prompt(s) and response(s) shown in the single generative AI interface 680 for all of the corresponding events of the life story component 670. In some embodiments, the generative machine-learning model 674 and/or generative AI interface 680 utilize a large language model ("LLM") such as ChatGPT available from OpenAI LP of San Francisco, CA. In other embodiments, other LLMs, combinations of LLMs, or modifications of LLMs (including fine-tuned instances of LLMs) such as PaLM, BERT, CodeX, LaMDA, Falcon, Cohere, LLaMA, or related or derivative models, may be utilized as suitable. In some embodiments, the LLM may be a LLM trained on a corpus of genealogy data specific to a genealogy research platform.

In some embodiments, one or more filters or other preferences may be added to the prompt or additional prompts 684 for a user to guide the generation of responses. For example, the user may add a race, gender, or other demographic filter (or a combination of filters) to require the generative AI model to be more specific to aspects of the person's life and circumstances in generating a response. In the example above, Heijiro Shiozawa's life story is shown and generative AI prompts corresponding thereto are provided; however, by providing a user with a filter to select for race (Japanese American), a customized prompt may be delivered to the model so that the model can tailor its response to the unique circumstances and experiences of Japanese Americans in the pertinent location and time (Rigby ID in the early 20th century), which would substantially alter the generated results compared to the majority white population of Rigby. While race and gender are described, it will be appreciated that any suitable filter or combination of filters allowing a user to tailor their responses may be provided.

In some embodiments, the prompts 684 are predetermined using a prompt engineering methodology to prevent the generative AI model(s) from generating content that is offensive, biased, inaccurate, or out of scope to what the user is requesting. Additionally, or alternatively, the prompts 684 may be engineered to automatically incorporate details specific to the life story component 670, such as dates, locations, genders, occupations, ages, countries, and/or other details as suitable. Thus a user may click a button with a simplified prompt such as "Tell me about birth traditions in Shizuoka, Japan around this time" and the model, in the background, receives a more-complicated prompt such as "Tell me about birth traditions in [State], [Country] in [Year]. Your response must be less than 250 words in total and cannot include any prose or flowery language. Use a template for your response, including a brief introduction and no more than 3 subsections, each 60 words or less. Use a tone that is warm and knowledgeable with an 8th grade reading level. Include validated specifics about the location and time period given. Avoid hallucination and do not speculate on feelings or emotions. Use respectful and inclusive language, avoiding any discrimination or bias," with the bracketed details automatically pulled from the life story component 670. It will be appreciated that in some embodiments in which filters or other customizations are enabled, the prompt that the model receives will be correspondingly adjusted.

While in some embodiments the predetermined questions/prompts are consistent across different persons (with the ability to plug in person-specific details such as dates and locations as described above), in other embodiments the prompts are dynamically determined for individual users. In some embodiments, the prompts are generated by a machine-learned model based on the details of the person and/or based on the interactions of the user with the life story component 670. This may advantageously allow a user to experience a personalized and dynamic research experience with each life story component 670 of each person they are researching.

The generated response(s) may have limited visibility, saveability, and/or shareability, as suitable. In some embodiments, the responses are only generated for deceased persons. In some embodiments, the responses are only visible to living descendants of the deceased persons for whom the responses are generated. In some embodiments, the responses are sharable on social media; in other embodiments, the responses are limited in social-media shareability. In some embodiments, a user may concatenate responses to various questions (which responses may include text, images, and other media) to generate a biography of a person, save the same to the person's profile or life story component 670, and/or share the biography across various media.

In some embodiments, a machine-learned evaluation model or modality may be configured to sample responses generated using the generative AI module 674 to provide that the responses are presentable to a user. The machine-learned evaluation model may be configured to assess one or more of inclusivity, relevance and/or personalization, quality and/or tone, accuracy, and/or plagiarism, among other possibilities. The machine-learned evaluation model may assess whether the generated responses are acceptable for each individual user and/or person (i.e. the subject of the response) based on, e.g., supervised training, unsupervised training, or other approaches. This advantageously enables the embodiments of the disclosure to provide that generative AI-generated responses are not offensive and/or misleading to users.

Example System for Generating Narratives Based on Historical Records

Figure 7:
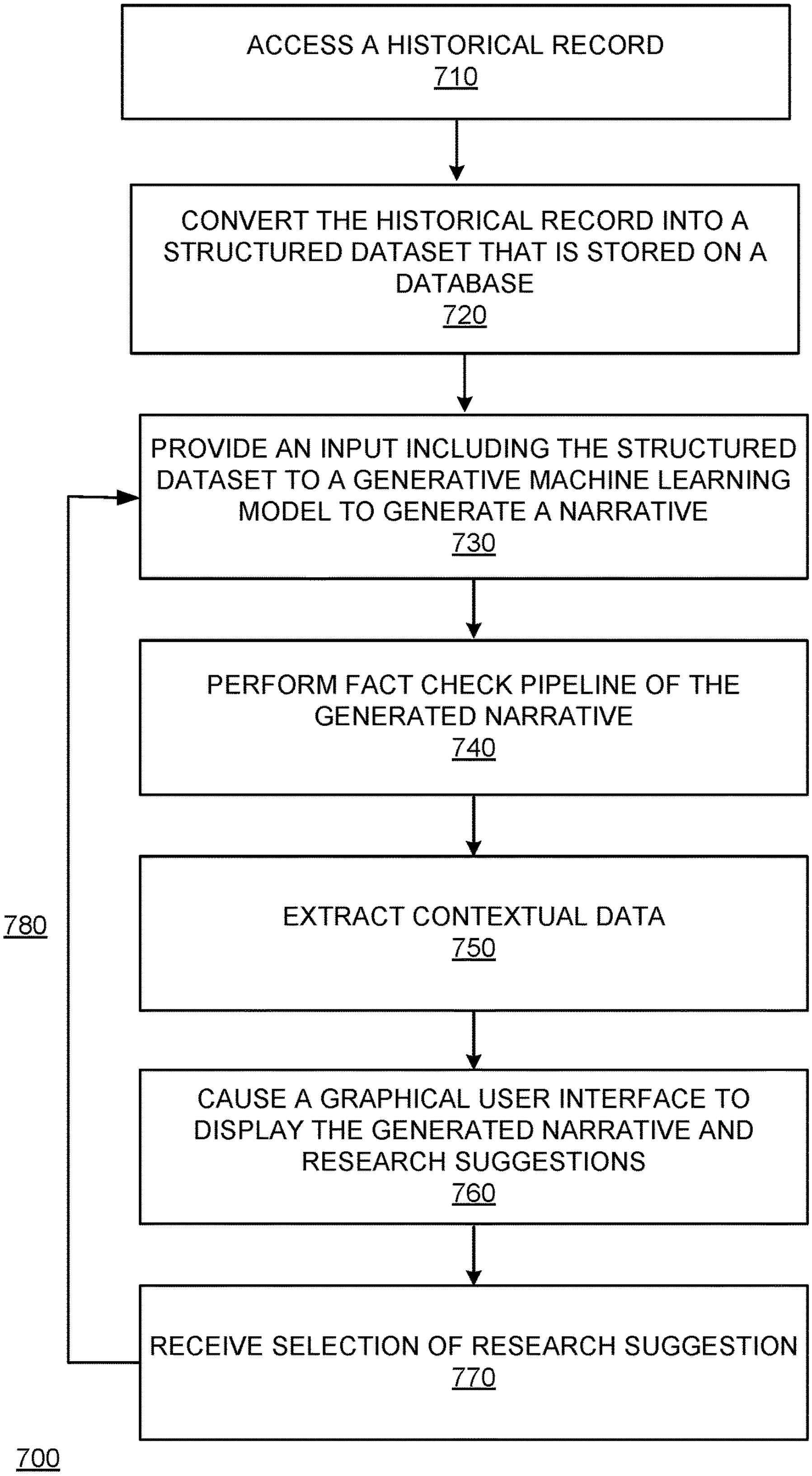
FIG. 7 is a flowchart illustrating an example process for using a machine-learning language model to generate a narrative based on historical records, in accordance with some embodiments.

FIG. 7 is a flowchart depicting an example process 700 for generating a narrative based on historical, in accordance with some embodiments. The process may be performed by one or more engines of the computing server 130 illustrated in FIG. 2, such as genealogical summary engine 270. The process 700 may be embodied as a software algorithm that may be stored as computer instructions that are executable by one or more processors. The instructions, when executed by the processors, cause the processors to perform various steps in the process 700. In various embodiments, the process may include additional, fewer, or different steps. While various steps in process 700 may be discussed with the use of computing server 130, each step may be performed by a different computing device.

In some embodiments, the computing server 130 accesses a historical record (step 710). A historical record may correspond to a document, artifact, dataset, or any other source of information that details and corroborates events, developments, transactions, or observations from the past. These records may provide data and evidence about historical periods, events, figures, and trends. Historical records may take many formats and come from a wide variety of sources. These may include textual documents, such as letters, diaries, meeting minutes, newspapers, birth certificates, legal documents, and government documents. Historical records may also be datasets, like census data, employment records, economic data, criminal records, or birth registries. Multimedia files, like photographs, audiovisual recordings, paintings, and maps, also form valuable historical records.

In some instances, historical records may be hard to understand. For example, historical records may prove challenging to understand due to a multitude of reasons, particularly when they involve outdated or unconventional data forms. One of the primary issues may be that of legibility, often arising from bad handwriting or degradation over time if the records were initially in paper format. Handwritten entries, especially those from earlier periods, may vary greatly in style and clarity. Script forms, writing implements, and paper quality varied widely across time periods and locations, often making reading and comprehending them challenging. Besides, over time, physical records may deteriorate, making the handwriting increasingly unreadable.

Apart from legibility, another challenge may be the understanding of the contextual relevance of historical records. A significant portion of historical records may include fragments of data entries that are disconnected or lack contextual metadata. Understanding these scattered bits of information in isolation may be tough without knowledge of the broader narrative or context in which they fit. Furthermore, older records may use dated or archaic language, terminology, or data encoding formats, making it difficult for modern systems or interpreters to map them to present understandings. Further, cultures may vary in their naming conventions, place names, measurement systems, and calendar systems. These variations may all be reflected in historical records and may cause confusion if not properly interpreted. This complexity may be magnified when these records are part of datasets containing intricate, interconnected information such as genealogy trees or personal histories.

Further, there is a challenge for users in the volume of information that may be returned by a search or by research done on a genealogical research service. When a user is sifting through potentially thousands of relevant records relating to an ancestor, such a user is unlikely or unable to spend the time to delve deeply into a Census record with many irrelevant details including names, occupations, ages, addresses, and other details from non-ancestors. A time-constrained user, therefore, may benefit from an approach that leverages a narrative-generation modality as described herein to receive the record and filter the information contained therein to summarize the salience of the record vis-à-vis the user's research into a particular ancestor in a format that is easy and fast to digest. This advantageously democratizes the information relegated to hard-to-find and hard-to-understand records, particularly for new and untrained users of a genealogy research service.

Providing such narratives to users as hints, as opposed to in the course of purposeful search-based research, may be additionally beneficial in that it can make the hints for a user who may not be intentionally conducting research on a particular ancestor emotionally engaging, and thereby prompt the user to view and accept the hint and conduct further research into the pertinent ancestor.

To retrieve a record, the computing server 130 may communicate with various databases, such as genealogy data store 200, and identify a specific historical record on a given database. For example, the historical record may correspond to datasets that contain information about an individual's background and their past. The historical record may provide information to build a genealogical tree and significant insights into an individual's life. For example, the historical records may include location records, birth registries, identification records, census data, employment records, and/or historical event records.

In some embodiments, the computing server 130 converts the historical record into a structured dataset that is stored on a database (step 720). A structured dataset may correspond to an arrangement of historically recorded information. FIG. 8C provides an example of a structured dataset 850, such as columns and rows, key-value pairs, comma separated values, and other structured data. The computing server 130 may extract information included in the historical record to create computer-readable data. The extraction process of information from historical records by the computing server 130 may include a series of complex, interrelated tasks that transform raw, and often messy, data into a computer-readable format. The specific method employed may rely on the type of historical record at hand. In cases where scanned documents are the source of information, the process may include digitizing the content through optical character recognition (OCR) technology. The OCR may scan the document and convert the scanned text image into machine-encoded text, essentially transcribing the content into a format that a computer can read. This process may be driven by pattern recognition algorithms that distinguish different shapes and characters and translate them into their equivalent digital codes. In some embodiments, suitable handwriting recognition modalities are utilized to transform images of handwritten information into machine recognizable data. Such handwriting recognition modalities may include any suitable number and/or variety of machine-learned models for transforming handwritten images into corresponding characters.

For example, if the historical data are in the form of electronic textual documents, the computing server 130 may use text mining and/or natural language processing (NLP) techniques to extract useful information. These techniques may parse the text and break it down into smaller components like phrases and words, which may be evaluated and converted into a computer-readable format.

The computing server 130 may convert the computer-readable data into a defined structured dataset. The computing server 130 may define the structure in which the data should be organized. This structure may define what attributes or columns will be included in the dataset, what type of data each column should hold (numeric, string, date-time, boolean, etc.), and constraints such as required fields or unique keys. This structure may the blueprint for the structured dataset.

The computing server may convert the computer-readable data to align it with the defined dataset's structure. This process may include arranging and modifying the extracted data to match the set of attributes or fields predefined in the structured dataset. If certain variables need to be represented differently, the computing server 130 may apply various transformation processes such as one-hot encoding for categorical variables or normalization for numerical variables. The computing server 130 may provide consistent data types across each attribute to comply with the structure definitions.

The computing server 130 may fit the transformed data into the defined structure to create the structured dataset. By defining the target dataset structure, transforming the computer-readable data to comply with it, and organizing the data within the defined structure, the computing server 130 may convert the computer-readable data into a well-structured dataset.

In some embodiments, the computing server 130 provides an input to a generative machine learning model to generate a narrative (step 730). The generative machine-learning model then generates a narrative given the input.

In some embodiments, the input may include a collection name, record data and a prompt. The collection name may be the name of the record collection from which a particular record is selected. An example of a collection name a particular census record of a year. The record data may be a dataset such that the dataset shown in FIG. 8C. The prompt may include instructions for the generative machine-learning model to act in a certain capacity and frame a narrative based on the record data and the collection name. An example of the prompt may be the following: "Acting as a family historian, please draft a narrative from the details of a U.S., Newspapers.com™ Marriage Index, 1800s-current entry below. Please include statistics and details that are applicable for the time region and details included below. Before sending your response, considers perspectives from different ethnicities, genders, religions, cultures, classes, and abilities in this specific place and time; uses trusted primary sources to ensure accuracy and reliability; avoids hallucination and speculation about feelings or emotions; avoids direct copying or paraphrasing of existing sources; uses respectful and inclusive language; uses a warm tone with an 8th grade reading level."

The generative machine-learning model may generate a narrative given the input including the collection name, the record data and the prompt. After the narrative is generated, specific facts may be extracted from the narrative by the computing server 130. For example, the computing server 130 may provide a prompt to the generative machine-learning model to return a list of "k" facts from the generated narrative, where "k" correspond the total number of individual facts extracted from the narrative. Each fact may correspond to a piece of information identified within the larger context of the narrative.

The computing server 130 may validate each one of the "k" facts by performing a fact check pipeline (step 740). For example, the computing server may provide each one of facts to the generative machine-learning model in parallel calls, each call checking for the validity of each fact. In response, the generative machine-learning model may provide to the computing server 130 a binary response (indicating whether the fact is true or false, or as an accuracy score) or a corrected version of the fact. Based on the validation process, the generated narrative may be displayed, saved, edited for inaccuracies, or entirely regenerated with an updated prompt to the generative machine-learning model by the computing server 130. An example of fact checking process will be further discussed below in association with FIG. 9C.

In some embodiments, the computing server 130 may extract contextual data to construct another prompt for the generative machine-learning model to generate research suggestions (step 750). In some embodiments, on the back-end, the computing server 130 may issue an API command to send another prompt to the generative machine-learning model to have the model to generate genealogy research suggestions based on the narrative 870. The prompt may include contextual data of current research of the end user. For example, the computing server 130 may record last N steps or last N records that the end user has browsed before the narrative 870 was generated. The contextual data may also include the last N interactions, commands, profiles reviewed by the user. The computing server 130 may include the contextual data as part of the prompt to request the generative machine-learning model to generate the genealogy research suggestions 880.

In some embodiments, the computing server 130 causes a graphical user interface to display the generated narrative and research suggestions (step 760). The computing server 130 may cause the graphical user interface to display the generated narrative by packaging the generated narrative in a format suitable for display and transmitting the packaged narrative to the graphical user interface. The computing server may provide a dynamic frontend framework on the graphical user interface to allow interaction with the narrative. As shown in FIG. 8D, the computing server provides the generated narrative 870 is provided on the user interface 860. Interactive elements, such as interactive elements (e.g., suggestions 880) are provided such that the user can click on them to generate a new narrative.

In some embodiments, the computing server 130 may provide an iterative interaction to the user. For example, the computing server 130 may suggest follow-up prompts to the user in response to the generated narrative. As shown in FIG. 8D, the computing server 130 may provide suggestions 880 in response to the generated narrative 870 on the graphical user interface 860. The suggestions may take the form of genealogy research suggestions.

In some embodiments, the computing server 130 may receive a selection from the user on one of the research suggestions 880 (step 770). For example, after the narrative 870 is generated and displayed, the computing server 130 may display research suggestions 880 that the form of interactive elements such as user interface buttons. Examples of the suggestion 880 may include 'what was Michigan, USA like when Earl S. was born?', 'tell me more about the technological advancements of this era?' etc. When a user clicks on the suggestion 880 'what was Michigan, USA like when Earl S. was born?', the computing server 130 may provide the suggestion 880 as a third prompt to the generative machine-learning model to generate a new narrative. The new narrative may be generated according to the process provided in the present disclosure. For example, the computing server may generate a new narrative given some of the same inputs discussed above including the same collection name and/or the record data.

The process of having the generative machine-learning model to generate narrative 870 (step 730), using a fact check pipeline to make sure the narrative 870 is accurate (step 740), providing contextual data of user's current research from computing server 130 to have the generative machine-learning model to generate research suggestions 880 (step 750), displaying the generated narrative and the research suggestions (step 760) and receiving user's selection of a suggestion 880 (step 770) to generate additional prompt for the generative machine-learning model to generate another narrative 870 may be carried out iteratively, as indicated by the arrow 780, as the user continue to browse in real time information displayed on the user interface.

As shown in FIG. 8D, the graphical user interface 860 provides the user an input box 890 such that the user can provide a new search (or query). For example, the user can enter the following search 'tell me more about the cars of this era?'. The user may click on the 'Submit' button to submit the search to the computing server 130. The computing server 130 may receive the search submitted by the user. The computing server 130 may provide the search as a new prompt to the generative machine-learning model to generate a new narrative. The new narrative may be generated according to the process provided in the present disclosure. For example, the computing server 130 may generate a new narrative given some of the same inputs discussed above including the same collection name and/or the record data.

In some embodiment, the computing server 130 may generate a narrative that can then be shared with family groups or published on online platforms. By making this data more relatable and engaging, the computing server 130 may improve the overall user experience on a platform.

In some embodiments, the computing server 130 may generate a narrative by using prompt chaining. Prompt chaining may refer to an iterative process involving several steps. For example, in a first step, historical record data and/or genealogy record for an individual may be inputted into a generative machine-learning model, which generates an easily understandable narrative. In a second step, an abbreviated version of the original data may be used to prompt a generative machine-learning model to provide a wider historical context for the individual. This may include information about both the direct environment (micro) and broader societal events (macro) during the individual's lifetime. In a third step, the generated narrative and the historical context data may be used to prompt the generative machine-learning model to provide a comprehensive narrative in a desired output format.

In some embodiments, the computing server 130 may provide image integration on the user interface. For example, beyond just placeholder images for records, the computing server 130 may provide curated images that correspond with specific narratives. For instance, the computing server 130 may provide a map to accompany a narrative.

In some embodiments, the computing server 130 may provide a narration based on the generated narrative. For example, the computing server 130 may provide a voiceover to narrate the generated narrative. The voiceover may replicate the voice of known figures like Henry Louis Gates Jr. This may make users feel more engaged.

In some embodiments, the prompt to a generative machine-learning model may include instructions to generate a multimedia narrative, including a written narrative and/or an image corresponding to the record details. For example, images of a particular ancestor pertaining to a different record and retrieved from a cluster database may be provided to a model with instructions to generate an image of that ancestor (as shown in the image) at an age and/or context corresponding to the instant record. Thus, for example, a military draft record for an ancestor, an image of whom is only available from later in that ancestor's life, may be provided to the generative machine-learning model with instructions to show that ancestor dressed in context-appropriate military regalia at the age they were in the military draft record. A family portrait based on the ages and composition of the family as shown in a particular year's census record may be generated based on the instructions to the generative machine-learning model and in embodiments based on received images of one or more family members as retrieved from, e.g., the cluster database. Such narrative forms can fill gaps in a family history and add color and life to the otherwise emotionally sterile records that might be available to a user, thereby improving emotional engagement and facilitating better genealogical research.

Example System for Generating Context Data

Below is disclosed an example process for generating context data associated with a genealogy record, in accordance with some embodiments. The process may be performed by one or more engines of the computing server 130 illustrated in FIG. 2, such as genealogical summary engine 270. The process may be embodied as a software algorithm that may be stored as computer instructions that are executable by one or more processors. The instructions, when executed by the processors, cause the processors to perform various steps in the process. In various embodiments, the process may include additional, fewer, or different steps. While various steps in process may be discussed with the use of computing server 130, each step may be performed by a different computing device.

In some embodiments, the computing server 130 receives a request to generate context data associated with a genealogy record. For example, the client device 110 may send the request to the computing server 130 over the network 120. In some embodiments, the computing server 130 accesses historical records related to the genealogy record. The computing server may access the historical records related to the genealogy record by communicating with various databases that manage historical records and identifying the historical records that related to the genealogy record in some of these databases.

In some embodiments, the computing server 130 searches through the historical records for data related to the individual. The computing server may search through the historical records for data related to the individual by: converting the data related to the individual into a structured query that can be used to search databases associated with the historical records; executing the structured query on one or more databases associated with the historical records; processing records returned by the query; and extracting data from the processed records, wherein the data is usable to generate context data for the genealogy record. Converting the data related to the individual into the structured query that can be used to search databases associated with the historical records may include defining fields, keywords, and criteria based on the data related to the individual. Executing the structured query on the databases associated with the historical records may include sending the structured query to the databases and scanning through the databases' data entries for matches. The computing server may process the search results returned by the query by checking the returned records for relevance and filtering out irrelevant records.

For example, the computing server may take the individual-related data from the received request and transforms it into a structured query. This procedure may include mapping of data to specific fields, keywords, or criteria that can be identified in the databases storing the historical records. This structured query is implemented to thoroughly search through these databases for records and data that are pertinent to the individual in question.

Upon the formation of the structured query, the computing server then executes the search on one or more databases associated with the historical records. As search results are returned by the query, they are then processed. Part of the processing includes checking each returned record for relevance towards the query's context. The computing server may assess each record to determine whether it provides meaningful information about the individual. Irrelevant records are filtered out to maintain the quality and relevance of the data being used. Context-relevant data may be extracted from the processed records. This extracted data may be used by the computing server 130 to generate the context data for the genealogical record.

In some embodiments, the computing server 130 generates a plurality of embeddings from the data related to the genealogy record. The embeddings may include a first set of one or more embeddings generated from the data related to the individual and a second set of one or more embeddings generated from a family tree data for the individual. The computing server may convert each component of the data related to the genealogy record and each component of the family tree data into a numerical representation. Converting each component of the data related to the genealogy record and each component of the family tree data into the numerical representation may include mapping a categorical variable and/or an ordinal variable into a numerical representation that can be interpreted by a machine learning model.

The computing server may apply a machine-learned model trained on similar data to the numerical representation of the genealogy record data to transform it into the first set of embeddings. The embeddings may position the individual's data within the latent space of the machine learning model. Each embedding's position may be determined by the characteristics of the individual's data such that similar data instances or characteristics are positioned closer together within the latent space. The computing server may apply a machine-learned model trained on similar data to the numerical representation of the family tree data to transform it into the second set of embeddings, wherein similar family trees or familial relationships result in embeddings positioned closer together in the latent space of the machine learning model. A discussion of the machine-learned model and embeddings is provided in the present disclosure under the section Machine Learning Models.

In some embodiments, the computing server 130 applies the plurality of embeddings into a generative machine-learning model to generate the context data for the individual. The computing server may input the first and second sets of embeddings into the generative machine-learning model. The generative machine-learning model may generate the context data based on the first and second sets of embeddings by extracting patterns that exist in the first and second sets of embeddings and generating the context data based on the extracted patterns. A discussion of the generative machine-learning model is provided in the present disclosure under the section Machine Learning Models.

In some embodiments, the computing server 130 causes a graphical user interface to display the context data associated with the genealogy record.

The computing server 130 may cause the graphical user interface to display the context data associated with the genealogy record by packaging the context data in a format suitable for display, transmitting the context data to the graphical user interface, and upon receipt of the context data, causing the graphical user interface of the user device to display the genealogical summary. The computing server may provide a dynamic frontend framework on the graphical user interface to allow interaction with the genealogical summary. Similar steps were described in relation to step 370 of FIG. 3.

Context Data Tool

Figure 8A:
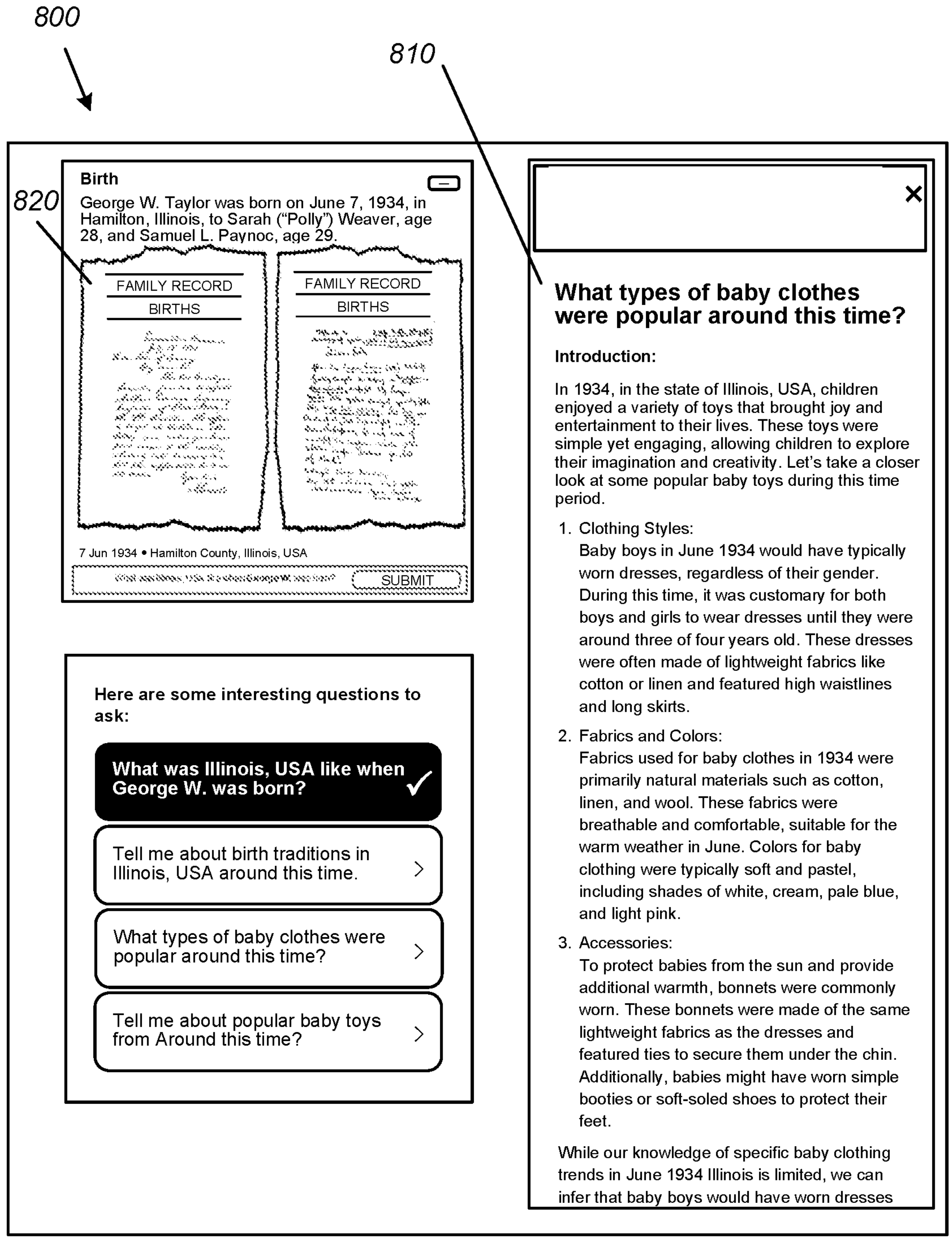
FIGS. 8A-8B illustrate a user experience of a context data tool interface, in accordance with some embodiments.
Figure 8B:
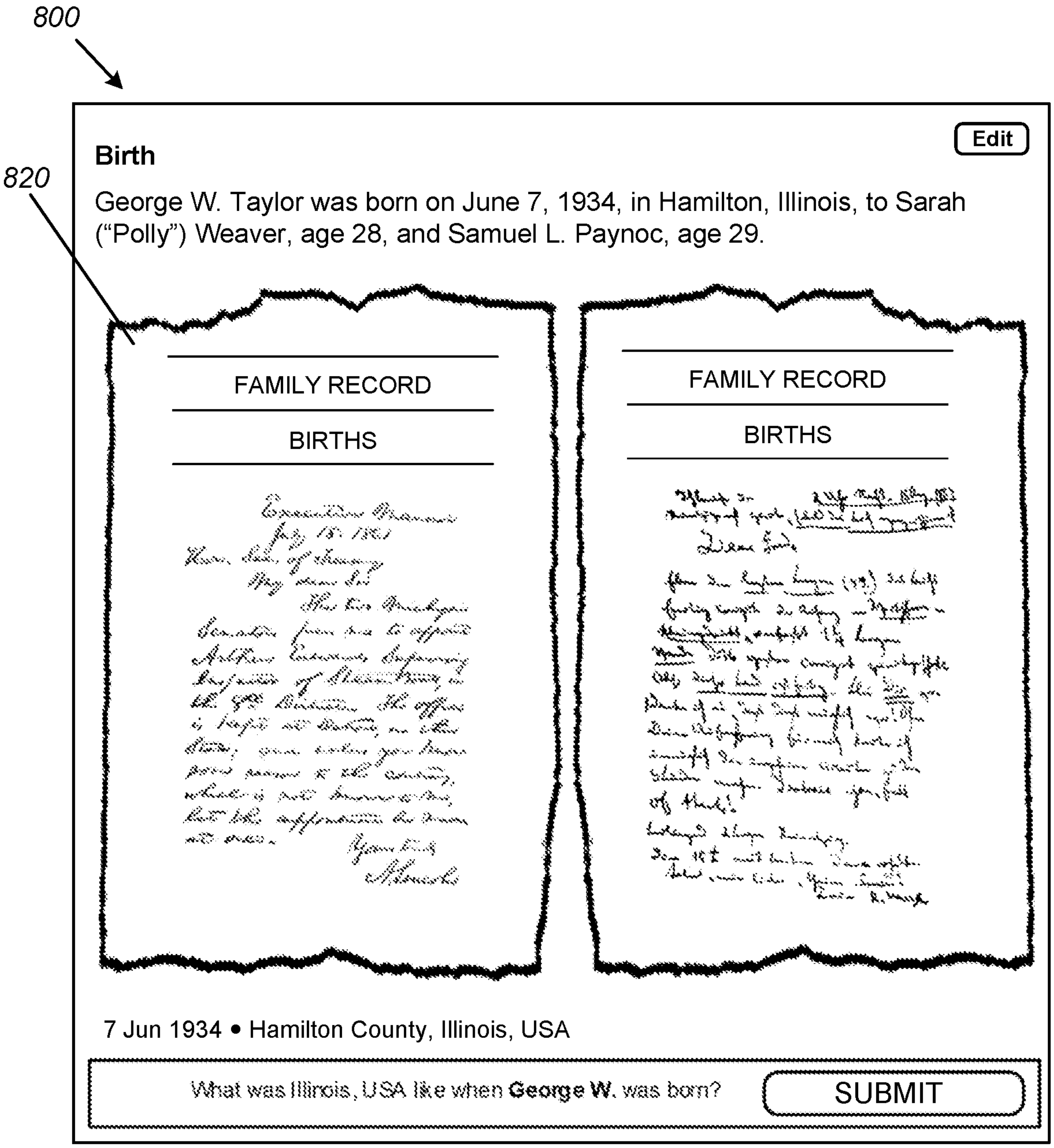
Figure 8D:
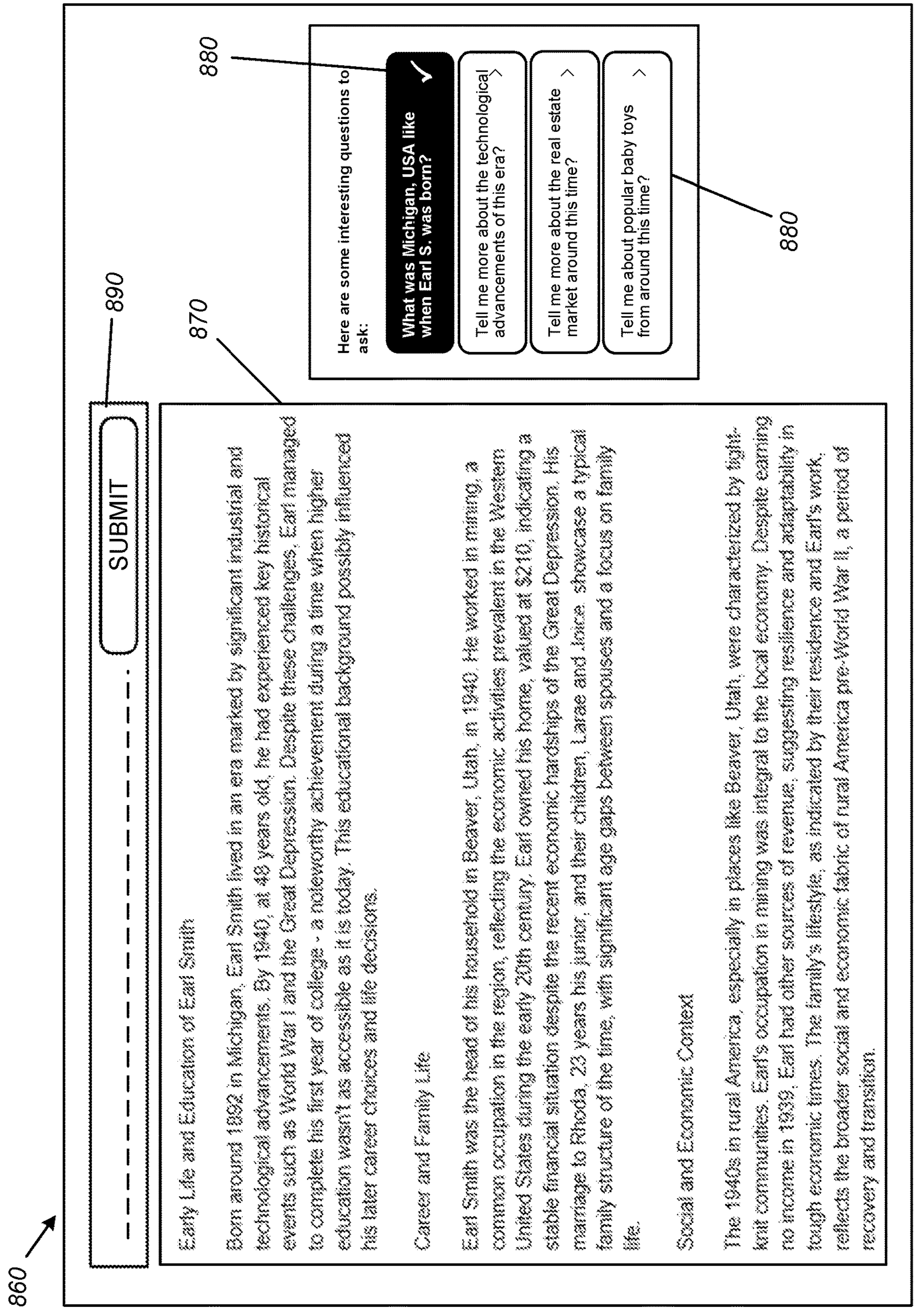
FIG. 8D illustrates a user interface that displays a narrative, in accordance with some embodiments.

Turning now to FIGS. 8A and 8B, a user experience of a context data tool 800 is shown and described. The context data tool 800 may have features similar to those of genealogical summary tool 600 in FIG. 6. As seen in FIG. 8A, the user experience 660 may include context data 810. The context data 810 is information generated by the tool 800 about an individual's genealogy record. The context data 810 results from processing historical records 820 and/or other relevant datasets through a generative machine-learning model. The context data 810 provides a user with an enhanced understanding of the records, essentially a detailed narrative that can explain the raw data and provide interesting insights about an individual's past.

A genealogy record may correspond to an individual's familial history and background. It includes information about an individual's lineage, ancestors, and familial connections. Genealogy records may be used to track family history, research hereditary diseases, or trace biological genealogy for various purposes including legal, historical, or personal reasons.

Historical records may correspond to datasets that contain detailed information about various elements of an individual's past. These may include location records (detailing geographies relevant to the person's life), birth registries (birth details), identification records (personal identification information), census data (population census details at given times), employment records (information about a person's career path), and historical event records (significant world or personal events the individual was involved in or lived through). An example of a historical record 820, in this example a birth record, is shown in the user interface of the context data tool 800 in FIGS. 8A and 8B.

Turning now to FIG. 8C, there is shown an example of a structured dataset 850. An example of a user interface that displays a narrative is shown in FIG. 8D.

Example System for Evaluating Data for Potential Noncompliance

Figure 9A:
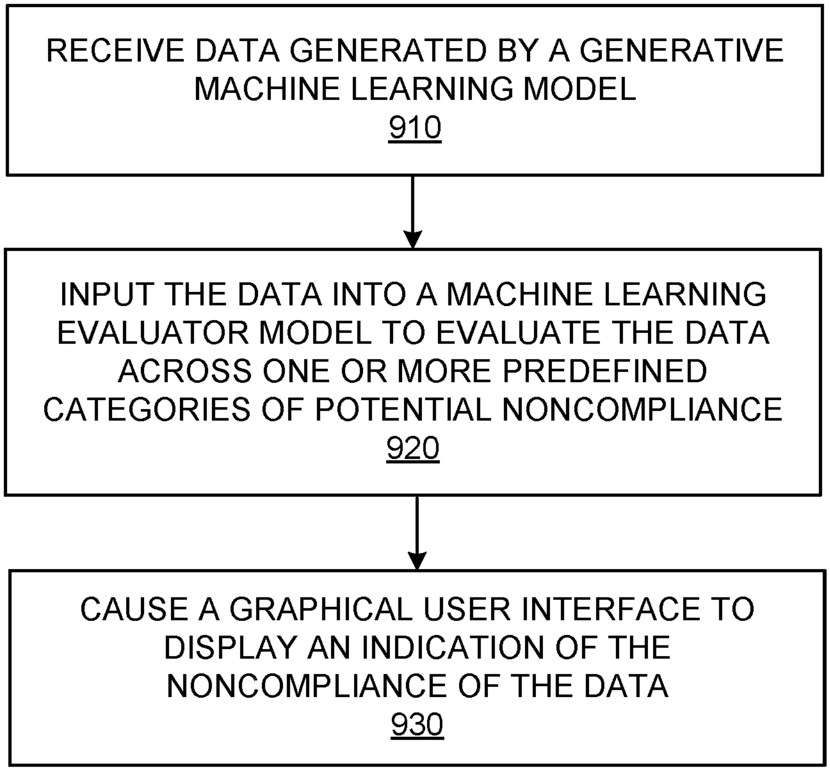
FIG. 9A is a flowchart illustrating an example process for using a machine-learning language model to evaluate data for non-compliance, in accordance with some embodiments.

FIG. 9A is a flowchart depicting an example process 900 for evaluating data for potential noncompliance, in accordance with some embodiments. The process may be performed by one or more engines of the computing server 130 illustrated in FIG. 2. The process 900 may be embodied as a software algorithm that may be stored as computer instructions that are executable by one or more processors. The instructions, when executed by the processors, cause the processors to perform various steps in the process 900. In various embodiments, the process may include additional, fewer, or different steps. While various steps in process 900 may be discussed with the use of computing server 130, each step may be performed by a different computing device.

In some embodiments, the computing server 130 receives data generated by a generative machine-learning model (step 910). The generative machine-learning model may output textual data that aligns with patterns and structures learned during its training. After this textual data is generated, it may be received by the computing server.

Data compliance may be a concern when using data generated by a generative machine-learning model because the model does not possess an innate understanding of human-hardwired rules for compliance. Compliance in this context refers to a vast spectrum of rules and standards that are devised to ensure the data's accuracy, appropriateness, legality, and adherence to contextual regulations. The computing server 130 may maintain one or more policies that govern the rules and standards. For instance, rules for compliance could span areas such as factual accuracy, the appropriateness of content, cultural sensitivities, adherence to regulations or laws specific to a domain or geography, respect for the user's rights and privacy, respecting company guidelines, and others. When generative models create data, they do so purely based on learned patterns from the training data and lack the ability to inherently respect these compliance rules. Therefore, there is a chance that the generated data may violate these rules, resulting in what is known as noncompliance. The risk of generating noncompliant content may be elevated when the training data itself contains noncompliant examples. These could be unknowingly reproduced by the model.

Noncompliance may refer to the situation when the generated data from the machine learning model violates certain guidelines, standards, or regulations. For example, noncompliance may indicate that the data is irrelevant or unsuitable for the target audience or the platform, such as explicit content on a family-friendly platform. Noncompliance may occur if the data violates the rights of others, such as infringing on someone's copyright or breaching privacy rights. Noncompliance may occur if the data are factually incorrect. Noncompliance may also occur if the data disregards legal regulations and laws, such as producing content that might be defamatory, offensive, slanderous, or libelous. Noncompliance may further occur if the data disrespects cultural norms or customs, such as utilizing culturally inappropriate language or symbols. Noncompliance can also occur if the data displays implicit or explicit bias, or if it discriminates against a certain group based on race, gender, religion, or any other protected characteristic. If the data contravenes the specific guidelines or conditions set by an organization, this may also constitute noncompliance.

In some embodiments, the computing server 130 inputs the data into a machine learning evaluator model to evaluate the data across one or more predefined categories of potential noncompliance (step 920). The computing server may evaluate the data across the predefined categories of potential noncompliance by: providing a score for each category of the predefined categories for the data; aggregating scores across multiple categories to generate a compound evaluation score, comparing the compound evaluation score to a predetermined threshold of noncompliance; based on the comparison, determining if the data is noncompliant; and generating an indication of the noncompliance of the data.

The evaluator model may process the data for each predefined category. It may assign a score for each category based on how closely the data aligns with the noncompliant patterns it has learned in its training phase for that category. The score may be a probability, a scaled value, or any other form that quantifies the extent of noncompliance within each category.

When evaluating content for noncompliance, the model may use a diverse set of evaluator categories. These include evaluators for detecting hate speech and threats of violence, explicitly sexual content, graphic violence, and content encouraging or depicting self-harm or suicide. The accuracy of the content may also be evaluated, as well as potential ethnic bias, gender or sexual identity bias, and economic or cultural bias.

In some embodiments, the model may provide the score for each category of the predefined categories for the data by assessing a degree of correlation or similarity between the input data and patterns learned by the machine learning evaluator model, determining a probability of the input data falling within a particular category based on learned patterns, and based on the determining, providing the score for each category of the predefined categories.

After scores have been computed for each category, these scores may be aggregated to create a singular, compound evaluation score. This compound score serves as a consolidated view of the potential noncompliance (or offensiveness) of the data across all predefined categories. The exact method of aggregation may vary, but it may include techniques like summing, averaging, or applying weights to the individual scores, depending on the design of the system and the relative importance of the various categories.

In some embodiments, the model may aggregate the scores across multiple categories to determine the compound evaluation score by assigning a weight to each category of the predefined categories and generating a compound evaluation score for the input data based on the individual score and weight of each category of the predefined categories. The compound evaluation score may represent a summative view of the potential noncompliance of the data across all categories.

While simple aggregation methods may include summing up or averaging the individual scores, sophisticated systems may assign different weights to different categories based on their relative importance. The weight associated with each category may reflect how critical that category is in classifying the input data. In certain contexts, some categories of compliance may be deemed more consequential than others. For example, in a kid-friendly environment, categories related to explicit or violent content might carry more weight than other categories.

These weights may be defined during the model design and may be static or dynamically adapted over time based on feedback. They could be set based on domain knowledge, user feedback, legal requirements, or through learning processes. The compound evaluation score may be generated using these weights along with the individual scores. Though exact processes may vary, an approach may be to multiply the individual score for each category with its corresponding weight and then sum these results across all categories. The resulting compound score may provide a weighted indication of the potential noncompliance of the data, taking into consideration the relative importance of each category. The compound evaluation score may offer a comprehensive view of the potential noncompliance of the input data, and it may be compared to a predetermined threshold to determine the overall compliance of the data.

In some embodiments, comparing the compound evaluation score to the predetermined threshold of noncompliance may include setting the predetermined threshold based on historical data, domain knowledge, and system requirements. The predetermined threshold may be a critical reference value that has been set to distinguish compliant data from noncompliant data. This value may not be randomly assigned but may be established based on several factors. Historical data may play a role, as trends and patterns of past evaluations may provide insights on where to reasonably set such a threshold. For example, if historical data indicates that scores higher than 0.7 often correspond to items that are later confirmed to be noncompliant, the threshold might be set around this value.

Domain knowledge may be another factor in setting the threshold. Specialists may have in-depth knowledge about the dataset or the specific subject area, assisting in deciding the threshold that best distinguishes compliant and noncompliant instances based on their professional judgment and observations.

System requirements or business rules may also contribute to setting this threshold. For example, if the system is designed to prioritize minimizing false negatives at the cost of potentially increasing false positives, the threshold may be set more stringently to capture more potential noncompliance.

After the threshold is set, the compound evaluation score may be compared to this value. If the score is above (or below, depending on the system's context) the threshold, the data is likely to be categorized as noncompliant. This comparison provides the system to effectively decide whether the generated content is likely compliant or noncompliant.

In some embodiments, the computing server 130 causes a graphical user interface of a client device to display an indication of the noncompliance of the data (step 930).

This may include sending a command to the graphical user interface with the information to be displayed. The information may be a simple binary indication (compliant/noncompliant), a score, a category of noncompliance, or even a detailed report, depending on the design of the system. This display may be accompanied by visual elements such as color coding (like red for noncompliance and green for compliance), graphs, or other visual tools to enhance the clarity of the information.

Consequently, users or system administrators may easily interpret the evaluation results just by looking at the graphical user interface display. Not only may this visualization aid in understanding the extent and category of noncompliance, but it may also guide further actions like initiating a review process, modifying system settings, or enhancing the training of the generative model.

The following is discussion about content moderation. Content moderation is the process of detecting content that are irrelevant, obscene, illegal, harmful, or insulting and taking necessary action. Content moderation may be critical for an organization to provide users a safe environment to collaborate and use the platform. A tool for content moderation may be an automated and scalable solution that can be used for many content formats and across different ancestry user interfaces/platforms.

The catalysts driving the priority are generative AI content and user generated content (UGC). In both of these cases, there may be an opportunity for harmful content to be created and published on an online platform, creating problems for organizations and customers. There may be a need for a system to address these issues. In addition to being automated, the system may have a mechanism for evaluation and improvement. It may also have mechanisms to escalate issues up to humans for review. These may include situations where a human needs to involve authorities or take action with regards to a customer or an external entity.

The system for evaluating and moderating content includes a variety of use cases. Use Case 1 (UC1) may include preventing escalating excessively offensive or potentially illegal content. This may be achieved by assigning content a score, and if it crosses a certain threshold, it is sent for Human Intervention. UC2 may include a REST-based synchronous evaluation, which allows for immediate response for messages evaluated as they are posted, specifically text and images. Should content get rejected, users may be given the apparatus to appeal this decision. In UC3 and UC4, the system may include asynchronous evaluation of audio and image content, due to the extended processing times required for these types of content. UC5 may provide users the ability to contest automated decisions at the point of content submission, giving them the opportunity to appeal rejections decided by the system.

To prevent bot interference, UC6 may include spam or bot detection, rejecting content recognized as being posted by bots. UC7 and UC8 may take a more extensive approach by bulk processing existing content, providing an analysis for current content, highlighting what would be rejected or approved (UC7), and removing flagrant existing content automatically (UC8). UC9 may include human reviews of the system's scores and ongoing performance to determine if improvements or changes are needed. The system's UC10 may include an event-based asynchronous evaluation, useful in existing systems. UC11 may include flagging new content considered illegal under specific jurisdictions, categories, and thresholds. UC12 may include scanning and management of exclusive content if flagged as potentially illegal. Users may be given the power in UC13 to report content they deem offensive or illegal. Authorized authorities may be provided access to review reported content and any necessary information with UC14. UC15 may address CSAM specifically by initiating a suite of actions when content is flagged under the CSAM category. UC16 may provide customers the ability to appeal content that has been moderated and removed manually.

UC17 may include setting analytical boundaries and thresholds through discussions revolving around moderation use cases. An aspect of urgency is provided in UC18, which may include providing immediate threats to a suitable evaluator for threat assessment. UC19 may include automated moderation of Gen AI text output. UC20 may be for the manual removal and tracking of content in response to a legal demand, allowing for appropriate response to such situations.

The system for evaluating and moderating content may cover various areas such as scores and thresholds management, content storage, and evaluation modes. The system may specify thresholds that are based on model, class, and confidence score to fine-tune when a human review is required.

The system may include storing content, scores, threshold levels, evaluator info, etc., for setting/resetting threshold levels and possibly fine-tuning/retraining associated ML models. The system may provide immediate evaluation of user content upon upload. Immediate evaluations may be necessary for handling situations that need proactive and reactive evaluations. The system may also provide delayed evaluation of user content when evaluations potentially take too long to be part of the request/response cycle with the user. The system may define the support for multiple evaluations per request and non-ML evaluators, focusing on efficiency in system responses. The system may process customer appeals when their content is rejected during the upload, a key functionality to keep a system transparent and engaging to users.

The system may provide the evaluation of toxic text. Several evaluators may be used to assess different types of content ranging from hate speech, sexually explicit material, and violence to potential self-harm triggers, spam, and user-to-user reporting. Using an assortment of modalities, including text, image, audio, and video, these evaluators may rate the content based on a defined hierarchy of harms and follow a specific scoring scheme.

The system may provide the evaluation of ethnic bias, economy or cultural bias, and plagiarism. It may use an embedding model for detecting toxicity with an accuracy level, on a specific dataset, reaching around 74%. The system may also evaluation other factors like harassment tone, readability grade level, and Child Sexual Abuse Material (CSAM), albeit only in image content. In addition, the system may provide a user-friendly moderation tool.

Figure 9B:
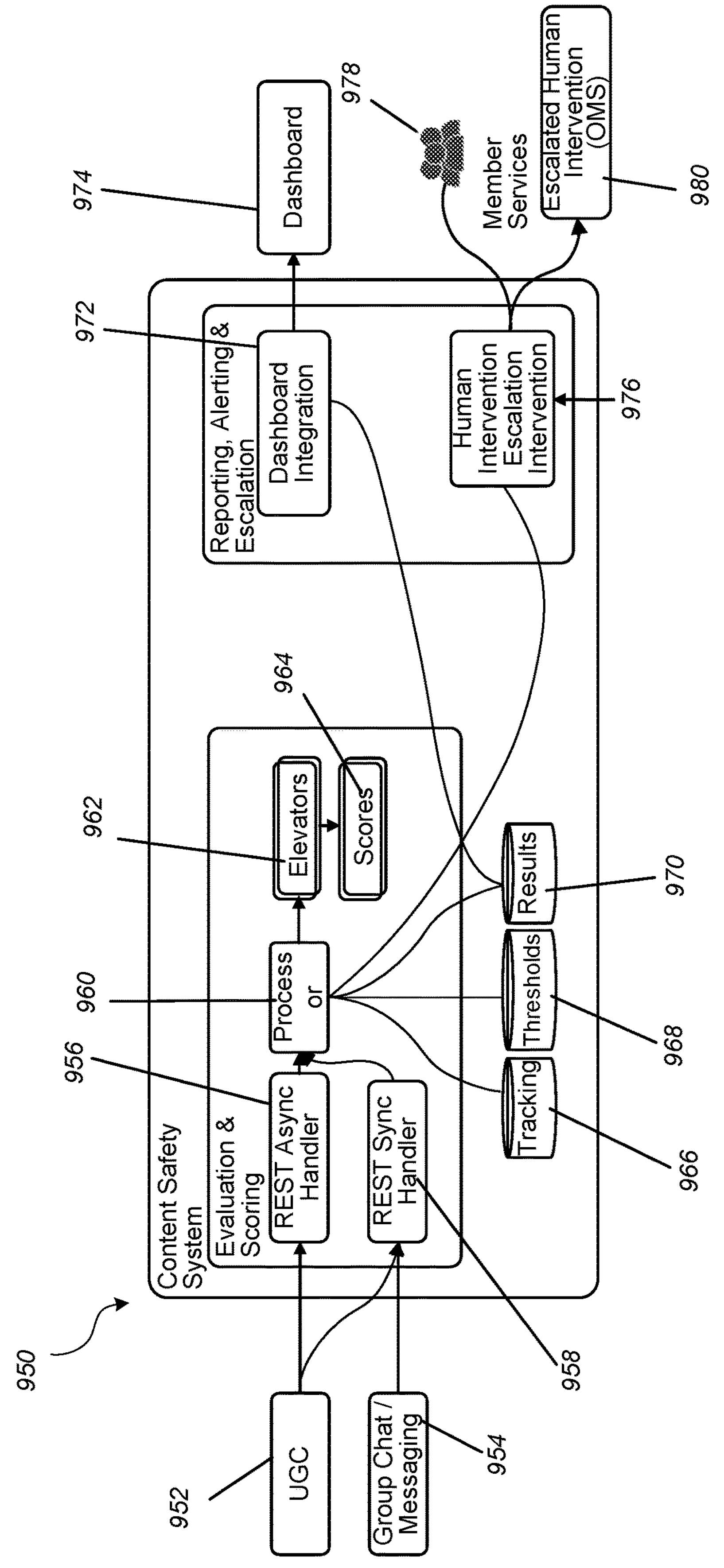
FIG. 9B illustrates a content safety system, in accordance with some embodiments.

FIG. 9B illustrates a content safety system 950. User Generated Content (UGC) 952 can be any content, such as text, images, or audio. They may be uploaded by the users. This system 950 may evaluate UGC for any signs of hate speech, violent material, and other forms of toxic communications. The system 950 may moderate synchronous (real-time) chats and messaging services 954 as well as asynchronous ones for the UGC cases.

Representational state transfer asynchronous handler (REST Async Handler) 956 is a component that handles cases where evaluation times are too long for users to wait. It may manage the initiation of content evaluation and result retrieval, all performed asynchronously. Where evaluation is quick enough to be part of the user's request-response interaction, the representational state transfer synchronous handler (REST Sync Handler) 958 may be deployed.

The processor 960 may assign IDs, call evaluators, determine thresholds, record results, and flag items that require human evaluation. Evaluators 962 may include heuristic codes or calls to external services like AWS Comprehend, plagiarism detection, or internal hate speech AI/ML systems. Evaluators may provide scores that aid in action determination if needed. Scores 964 may be results derived from the evaluators per content item. Each evaluator may return one or more scores based on their evaluation.

The tracking module 966 provides each content request a unique ID for tracking through the system. Based on the scores from evaluators, the thresholds module 968 may set thresholds for taking necessary action, effectively creating a mapping of scores to named values for actions. The results module 970 may store results, which are stored data capturing all details about a request such as evaluated content reference, matching scores, assigned thresholds, and more.

On the dashboard integration module 972, the system's metrics data may be provided to the dashboard 974, allowing temporal data mapping and assessment for different teams. The human intervention escalation integration module 976 may flag severe content scoring high in toxicity or other safety measures for human review.

The system may interface with member services 978, which is a department that handles users' direct queries or issues flagged via in-app mechanisms like the "report this content" button. The escalated human intervention (OMS) module 980 may provide for creating and managing groups and processes for escalated human review.

Figure 9C:
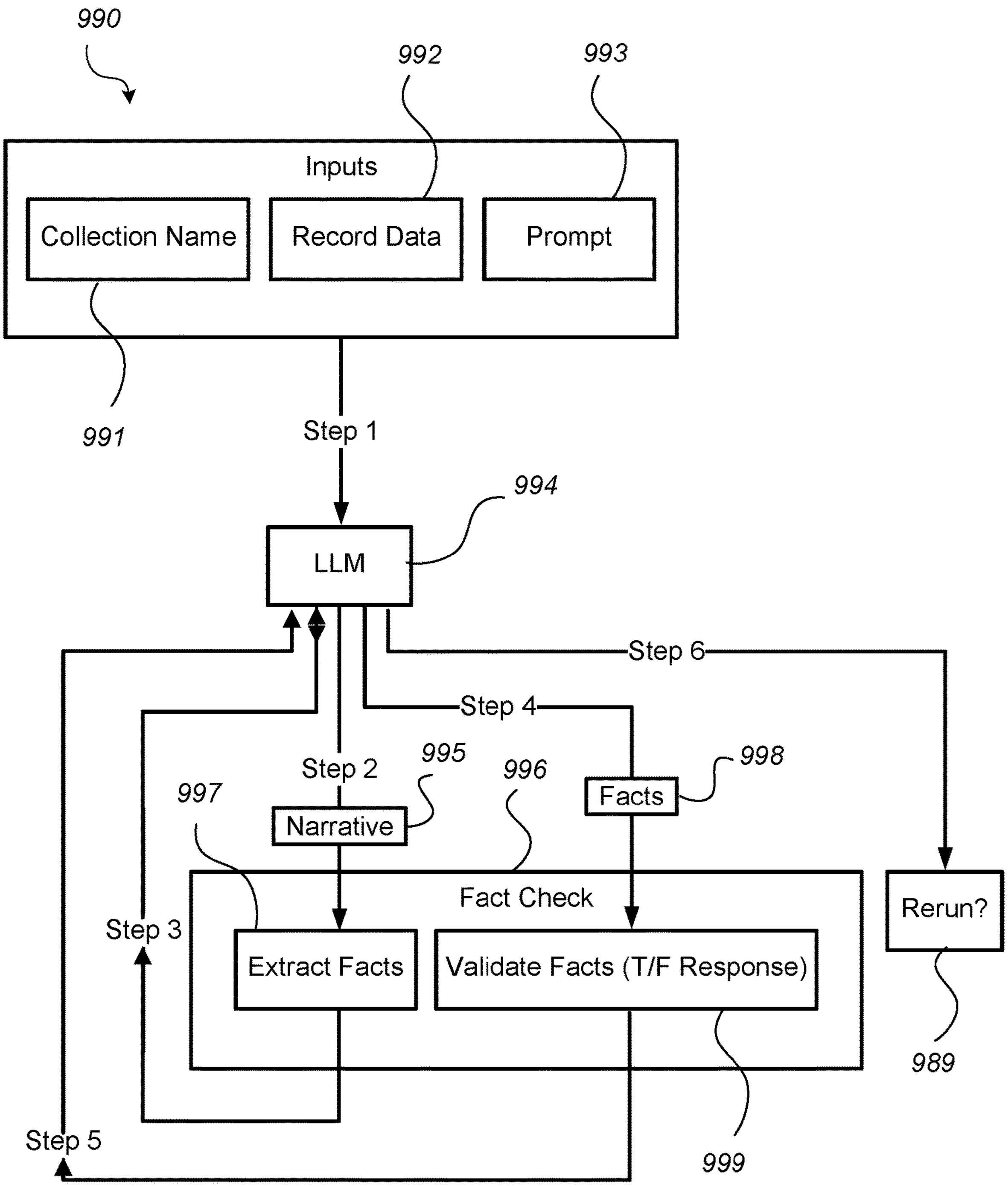
FIG. 9C illustrates a fact-check response system, in accordance with some embodiments.

FIG. 9C is a block diagram illustrating a fact checking pipeline for checking outputs that are generated by a generative machine-learning model, in accordance with some embodiments. The fact-check response system 990 facilitates extraction of facts from a record and validation of the extracted facts for factual accuracy. This advantageously allows for the use of the same generative machine-learning model to extract facts from a record and to ensure that the extracted facts are accurate.

As seen in FIG. 9C, a machine learning model 994 (e.g., a generative machine-learning model, etc.) may receive as inputs, in a first step, a collection name 991 (i.e., the name of the collection of records from which a particular record is selected), record data 992 (including OCR data from the particular record), and a prompt 993. The prompt may be engineered according to any of the embodiments described herein, including with instructions for the machine-learning model 994 to act in a particular capacity (e.g., as a historian or as a genealogist) and to draft a narrative from the details of the record data 992 and/or record collection name 991.

While an input comprising a single record and its associated data, a collection name, and prompt has been described, it will be appreciated that the disclosure is not limited thereto; rather, any suitable input may be utilized. For example, a plurality of records may be provided as input. These records may have been identified as related records through a cluster database, in which entities identified in distinct records, such as newspaper articles, birth, marriage, and death records, census records, property records, images, yearbook entries, or otherwise, are resolved to a same cluster in the cluster database as pertaining to a same person. A plurality of such records may be provided as input to the generative machine-learning model to generate a larger narrative that captures a greater breadth of details regarding the records. This can tell a "chapter" in a person's biography. For example, 20+ records may be used. Records that pertain to a same general timeframe of a person's life may be collated and used to focus on a single moment in a person's life. In some embodiments, all records pertaining to a person may be provided as input to provide a substantially comprehensive picture of that person's life.

In a second step, a narrative 995 may be generated by the generative machine-learning model 994 and passed to a fact-check module 996. The narrative 995 may include a plurality of facts that may be extracted and/or discretized into discrete facts by an extract facts module 997 of the fact-check module 996. The extract facts module 997 may utilize a call to the generative machine-learning model 994 to return a list of k facts from the generated narrative 995. The extracted facts 998 from the generative machine-learning model 994 are passed to a validate facts module 999 of the fact-check module 996. The validate facts module 999 may be configured to utilize k parallel calls to the generative machine-learning model to validate each of the extracted k facts 998 and return a binary T/F response for each. In some embodiments, the T/F response may be an accuracy score. Based on the assessment of the extracted k facts, the generated response may be displayed to a user at a graphical user interface of a user device, saved, edited to rectify any inaccuracies or other noncompliance events, regenerated with an updated prompt at the rerun module 898, or otherwise as suitable.

The generative machine-learning model may be fine-tuned from an off-the-shelf model by training the off-the-shelf model on a plurality of manually generated narratives that have been manually labeled with scores regarding accuracy and other noncompliance factors as discussed above such as tone. While a single generative machine-learning model has been shown and described, it will be appreciated that the disclosure is not limited thereto, but rather a plurality of generative machine-learning models may be utilized as suitable. For example, a module for factual accuracy, a module for tone, a module for bias or any other suitable module.

It has been surprisingly found that generative machine-learning models are fast at processing factual accuracy, tonal suitability, etc., while generative tasks like generating a narrative from a prompt are slow. As such, processing can be debottlenecked by discretizing the tasks of generating a narrative based on the inputs including the collection name, record data, and prompt; extracting facts; validating facts; and returning narratives to users as suitable. This advantageously improves accuracy and suitability of generated narratives without sacrificing processing speed.

In some embodiments, a narrative can be generated and a user can then utilize the generated narrative and the associated generative machine-learning model to further their genealogical research. For example, the user may select an option or enter a query inquiring what they could learn more about regarding their ancestors, thereby allowing the generative machine-learning model to suggest areas of further development and education for the user. The generative machine-learning model may be connected to a broader dataset and thereby facilitate further research for or by the user regarding the generated narrative. For example, follow-up prompts may be generated for the user on the fly based on the generated narrative. A narrative regarding a Census record from 1950 in the United States may tell the user a story regarding the state of their family or ancestors in a place and time. Follow-up prompts regarding the user's family (such certain family members' occupations, address, languages spoken, race, etc.) vis-à-vis the place and time may be flagged for further research. For example, the system may suggest follow-up prompts that allow a user to engage with the nuances and unique experiences of families of a particular ethnicity or racial background in a time and place where they may have faced and surmounted noteworthy challenges or obstacles. Perhaps a user's grandparent had a highly unusual occupation given the demographics of the area where they lived, leading to the user discovering a unique path taken by that grandparent.

Machine Learning Models

In various embodiments, a wide variety of machine-learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used.

In various embodiments, the training techniques for a machine learning model may be supervised, semi-supervised, or unsupervised. In supervised learning, the machine learning models may be trained with a set of training samples that are labeled. Any one of a number of supervised learning techniques may be used to train the models. Examples include, but are not limited to, random forests and other ensemble learning techniques, support vector machines (SVM), and logistic regression. In some cases, an unsupervised learning technique may be used, where the samples used in training are not labeled. Various unsupervised learning techniques such as clustering may be used.

In some embodiments, the machine-learned model may be a large language model (LLM) that is specifically designed to generate human-like text. This machine-learned model is part of a broader category of machine-learning models known as transformer models, which allow them to understand and process a natural language such as the language that humans naturally use to communicate. LLMs are categorized as large because they have numerous parameters (billions in some cases) that they adjust during the training process. The size of these models helps them better understand and generate human-like text because they can learn from a vast amount of data, memorizing a larger amount of information about language patterns and structures.

A generative pretrained transformer (GPT) is an example of an LLM. It may be trained on diverse data sets in an unsupervised learning manner, which means no explicit instructions or labels were provided to it during the training phase. Instead, it learned patterns and relationships from the data it was trained on and used these patterns to generate text that resembles human-written content. In practice, these models take a prompt (a piece of text input) and generate a text continuation. They predict the next part of a text based on the patterns they have learned and the specific prompt provided. LLMs have the ability to generate diverse types of text in a human-like manner, ranging from simple sentences to full articles. They may be used for a variety of applications such as draft generation, brainstorming ideas, writing assistance, and even in complex tasks like generating code or translating languages.

Figure 10:
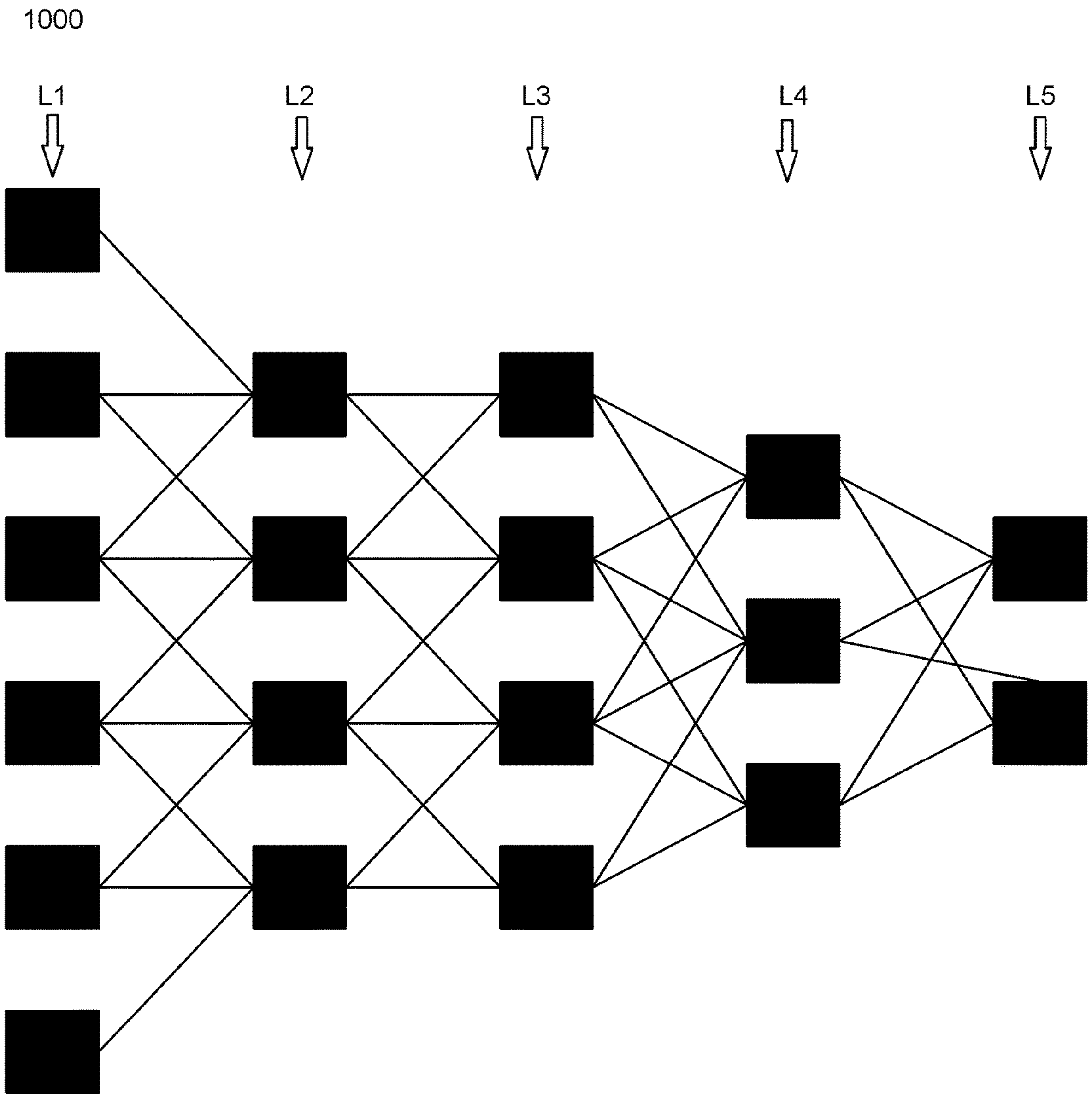
FIG. 10 shows an example machine-learned model, in accordance with some embodiments.

FIG. 10 shows an example machine-learned model 1000 that may be used to create an embedding. The machine learning models discussed in FIGS. 3, 4, 5, 6, 7 and 9 may include the architecture of machine-learned model 1000. The network model shown in FIG. 10, also referred to as a deep neural network, comprises a plurality of layers (e.g., layers L1 through L5), with each of the layers including one or more nodes. Each node has an input and an output and is associated with a set of instructions corresponding to the computation performed by the node. The set of instructions corresponding to the nodes of the network may be executed by one or more computer processors.

Each connection between nodes in the machine-learned model 1000 may be represented by a weight (e.g., numerical parameter determined through a training process). In some embodiments, the connection between two nodes in the machine-learned model 1000 is a network characteristic. The weight of the connection may represent the strength of the connection. In some embodiments, connections between a node of one level in the machine-learned model 1000 are limited to connections between the node in the level of the machine-learned model 1000 and one or more nodes in another level that is adjacent to the level including the node.

In some embodiments, network characteristics include the weights of the connection between nodes of the neural network. The network characteristics may be any values or parameters associated with connections of nodes of the neural network.

A first layer of the machine-learned model 1000 (e.g., layer L1 in FIG. 10) may be referred to as an input layer, while a last layer (e.g., layer L5 in FIG. 10) may be referred to an output layer. The remaining layers (layers L2, L3, L4) of the machine-learned model 1000 are referred to are hidden layers. Nodes of the input layer are correspondingly referred to as input nodes; nodes of the output layer are referred to as output nodes, and nodes of the hidden layers are referred to as hidden nodes. Nodes of a layer provide input to another layer and may receive input from another layer. For example, nodes of each hidden layer (L2, L3, L4) are associated with two layers (a previous layer and a next layer). A hidden layer (L2, L3, L4) receives an output of a previous layer as input and provides an output generated by the hidden layer as an input to a next layer. For example, nodes of hidden layer L3 receive input from the previous layer L2 and provide input to the next layer LA.

The layers of the machine-learned model 1000 are configured to identify one or more embeddings of transaction data. For example, an output of the last hidden layer of the machine-learned model 1000 (e.g., the last layer before the output layer, illustrated in FIG. 10 as layer L4) indicates one or more embeddings of a transaction. An embedding may be a high-dimensional vector. In some embodiments, the embeddings may also be extracted from any intermediate layer.

In some embodiments, the weights between different nodes in the machine-learned model 1000 may be updated using machine learning techniques. For example, the machine-learned model 1000 may be provided with training data identifying transactions with a label of transaction rule assignment applied to each rule. The label applied to a transaction may be based on transaction data of the computing server 110. In some embodiments, the training of the machine-learned model 1000 may also be the training or fine tuning of a machine-learned language model. In some embodiments, the training data comprises a set of feature vectors corresponding to a transaction, with each feature vector of the training data associated with a corresponding label related to a transaction rule. Features of a transaction of the training set determined by the machine-learned model 1000 are compared from the output layer of the network model and the label applied to the transaction of the training set, and the comparison is used to modify one or more weights between different nodes in the machine-learned model 1000, modifying an embedding output by the machine-learned model 1000 for the transaction.

Training of a machine-learned model 1000 may include an iterative process that includes iterations of making determinations, monitoring the performance of the machine-learned model 1000 using the objective function, and back-propagation to adjust the weights (e.g., weights, kernel values, coefficients) in various nodes. For example, a computing device may receive a training set that includes training data and labels assignments. The computing device, in a forward propagation, may use the machine-learned model 1000 to create predicted the label. The computing device may compare the predicted label with the labels of the training sample. The computing device may adjust, in a backpropagation, the weights of the machine-learned model 1000 based on the comparison. The computing device backpropagates one or more error terms obtained from one or more loss functions to update a set of parameters of the machine-learned model 1000. The backpropagating may be performed through the machine-learned model 1000 and one or more of the error terms based on a difference between a label in the training sample and the generated predicted value by the machine-learned model 1000.

By way of example, each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tan h), and rectified linear unit functions (ReLU). After an input is provided into the neural network and passes through a neural network in the forward direction, the results may be compared to the training labels or other values in the training set to determine the neural network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine-learned model 1000 has converged) or after a predetermined number of rounds for a particular set of training samples. The trained machine-learned model 1000 can be used for make inference or another suitable task for which the model is trained.

In some embodiments, such as using a language model to create embedding, training may be performed using an unsupervised learning techniques. Existing models such as those provided by the model serving system 170 may also be used for generating embeddings.

In various embodiments, the training samples described above may be refined and continue to re-train the model, which the model's ability to perform the inference tasks. In some embodiments, this training and re-training processes may repeat, which results in a computer system that continues to improve its functionality through the use-retraining cycle. For example, after the model is trained, multiple rounds of re-training may be performed. The process may include periodically retraining the machine-learned model 1000. The periodic retraining may include obtaining an additional set of training data, such as through other sources, by usage of users, and by using the trained machine-learned model 1000 to create additional samples. The additional set of training data and later retraining may be based on updated data describing updated parameters in training samples. The process may also include applying the additional set of training data to the machine-learned model 1000 and adjusting parameters of the machine-learned model 1000 based on the applying of the additional set of training data to the machine-learned model 1000. The additional set of training data may include any features and/or characteristics that are mentioned above.

The computing server 130 may create an embedding for a transaction and the embedding may include a multidimensional vector (e.g., N>10) representing the transaction in a latent space. The computing server 110 may use any suitable method for generating an embedding for the query. Example methods for generating the embedding for the query include Word2Vec, GloVE, as a layer in a neural network trained from a training set of documents or other text data, or any other suitable method.

EXAMPLE EMBODIMENTS

Embodiment 1. A computer-implemented method, comprising: receiving a request to generate a genealogical summary of a target user; retrieving genealogical records associated with the target user, the genealogical records comprising a documentation record and a family tree that is arranged in a hierarchical data structure comprising nodes connected by edges; identifying a path between a relative node representing a relative and a focus node representing the target user; traversing the path to convert the hierarchical data structure along the path to a relationship text string that comprises a description of relationships along the path in natural language; generating a plurality of embeddings from the genealogical records, the embeddings comprising a first set of one or more embeddings generated from the relationship text string and a second set of one or more embeddings generated from the documentation record; inputting the plurality of embeddings into a generative machine-learning model to generate the genealogical summary of the target user; and causing a graphical user interface to display the genealogical summary, the genealogical summary comprising a machine-generated summary describing a relationship between the relative and the target user.

Embodiment 2. The computer-implemented method of embodiment 1, wherein retrieving the genealogical records associated with the target user comprises: identifying the target user by a parameter including name and date of birth; and searching through a datastore to retrieve the genealogical records containing a reference to the identified target user.

Embodiment 3. The computer-implemented method of embodiment 1, wherein identifying the path between the relative node representing a relative and a focus node representing the target user comprises: selecting a particular relative node; and searching through the family tree to identify a path that leads from the focus node to the relative node.

Embodiment 4. The computer-implemented method of embodiment 1, wherein traversing the path to convert the hierarchical data structure along the path to a relationship text string that comprises the description of relationships along the path in natural language comprises: traversing the path node by node from the focus node representing the target user to the relative node representing the relative by following the edges representing relationships in the hierarchical structure, wherein each node represents an individual in the family tree and the edge connecting two nodes symbolizes the relationship between those two individuals; and converting the traversed path into the relationship text string.

Embodiment 5. The computer-implemented method of embodiment 4, wherein converting the traversed path into the relationship text string comprises: converting the edges representing the relationships between individuals along the traversed path into natural language.

Embodiment 6. The computer-implemented method of embodiment 1, wherein generating the plurality of embeddings from the genealogical records and the documentation record comprises: preprocessing the relationship text string; converting each word of the preprocessed relationship text string into a first set of numerical representation; applying a machine-learned model trained on similar data to the first set of numerical representations to transform them into the first set of embeddings, wherein the embeddings position the relationship text string's data within the latent space of the machine learning model, and wherein each embedding's position is determined by characteristics of the relationship text string's data such that similar data instances or characteristics are positioned closer together within the latent space; preprocessing the documentation record; converting features of the preprocessed documentation record into a second set of numerical representations; and applying a trained machine-learned model to transform the second set of numerical representations into the second set of embeddings, wherein the embeddings position the documentation record's data within the latent space of the machine learning model, and wherein each embedding's position is determined by the characteristics of the documentation record's data such that similar data instances or characteristics are positioned closer together within the latent space.

Embodiment 7. The computer-implemented method of embodiment 6, wherein preprocessing the relationship text string comprises: tokenizing the relationship text string into individual words to reduce words to their root form and/or remove any stop word that does not affect a semantic value of the text string.

Embodiment 8. The computer-implemented method of embodiment 6, wherein preprocessing the documentation record comprises: extracting features from the documentation record.

Embodiment 9. The computer-implemented method of embodiment 1, wherein causing the graphical user interface to display the genealogical summary comprises: packaging the generated genealogical summary in a format suitable for display; transmitting the packaged genealogical summary to the graphical user interface; upon receipt of the packaged genealogical summary, causing the graphical user interface of a user device to display the genealogical summary.

Embodiment 10. The computer-implemented method of embodiment 8, wherein causing a graphical user interface to display the genealogical summary comprises: providing a dynamic frontend framework on the graphical user interface to allow interaction with the genealogical summary.

Embodiment 11. A system comprising: one or more processors; and memory configured to store instructions, wherein the instructions, when executed by the one or more processors, cause the one or more processors to perform steps comprising: receiving a request to generate a genealogical summary of a target user; retrieving genealogical records associated with the target user, the genealogical records comprising a documentation record and a family tree that is arranged in a hierarchical data structure comprising nodes connected by edges; identifying a path between a relative node representing a relative and a focus node representing the target user; traversing the path to convert the hierarchical data structure along the path to a relationship text string that comprises a description of relationships along the path in natural language; generating a plurality of embeddings from the genealogical records, the embeddings comprising a first set of one or more embeddings generated from the relationship text string and a second set of one or more embeddings generated from the documentation record; inputting the plurality of embeddings into a generative machine-learning model to generate the genealogical summary of the target user; and causing a graphical user interface to display the genealogical summary, the genealogical summary comprising a machine-generated summary describing a relationship between the relative and the target user.

Embodiment 12. The system of embodiment 11, wherein retrieving the genealogical records associated with the target user comprises: identifying the target user by a parameter including name and date of birth; and searching through a datastore to retrieve the genealogical records containing a reference to the identified target user.

Embodiment 13. The system of embodiment 11, wherein identifying the path between the relative node representing a relative and a focus node representing the target user comprises: selecting a particular relative node; and searching through the family tree to identify a path that leads from the focus node to the relative node.

Embodiment 14. The system of embodiment 11, wherein traversing the path to convert the hierarchical data structure along the path to a relationship text string that comprises the description of relationships along the path in natural language comprises: traversing the path node by node from the focus node representing the target user to the relative node representing the relative by following the edges representing relationships in the hierarchical structure, wherein each node represents an individual in the family tree and the edge connecting two nodes symbolizes the relationship between those two individuals; and converting the traversed path into the relationship text string.

Embodiment 15. The system of embodiment 11, wherein converting the traversed path into the relationship text string comprises: converting the edges representing the relationships between individuals along the traversed path into natural language.

Embodiment 16. The system of embodiment 11, wherein generating the plurality of embeddings from the genealogical records and the documentation record comprises: preprocessing the relationship text string; converting each word of the preprocessed relationship text string into a first set of numerical representation; applying a machine-learned model trained on similar data to the first set of numerical representations to transform them into the first set of embeddings, wherein the embeddings position the relationship text string's data within the latent space of the machine learning model, and wherein each embedding's position is determined by characteristics of the relationship text string's data such that similar data instances or characteristics are positioned closer together within the latent space; preprocessing the documentation record; converting features of the preprocessed documentation record into a second set of numerical representations; and applying a trained machine-learned model to transform the second set of numerical representations into the second set of embeddings, wherein the embeddings position the documentation record's data within the latent space of the machine learning model, and wherein each embedding's position is determined by the characteristics of the documentation record's data such that similar data instances or characteristics are positioned closer together within the latent space.

Embodiment 17. The system of embodiment 16, wherein preprocessing the relationship text string comprises: tokenizing the relationship text string into individual words to reduce words to their root form and/or remove any stop word that does not affect a semantic value of the text string.

Embodiment 18. The system of embodiment 16, wherein preprocessing the documentation record comprises: extracting features from the documentation record.

Embodiment 19. The system of embodiment 11, wherein causing the graphical user interface to display the genealogical summary comprises: packaging the generated genealogical summary in a format suitable for display; transmitting the packaged genealogical summary to the graphical user interface; upon receipt of the packaged genealogical summary, causing the graphical user interface of a user device to display the genealogical summary.

Embodiment 20. A non-transitory computer readable medium for storing computer code comprising instructions, when executed by one or more computer processors, causing one or more computer processors to perform steps comprising: receiving a request to generate a genealogical summary of a target user; retrieving genealogical records associated with the target user, the genealogical records comprising a documentation record and a family tree that is arranged in a hierarchical data structure comprising nodes connected by edges; identifying a path between a relative node representing a relative and a focus node representing the target user; traversing the path to convert the hierarchical data structure along the path to a relationship text string that comprises a description of relationships along the path in natural language; generating a plurality of embeddings from the genealogical records, the embeddings comprising a first set of one or more embeddings generated from the relationship text string and a second set of one or more embeddings generated from the documentation record; inputting the plurality of embeddings into a generative machine-learning model to generate the genealogical summary of the target user; and causing a graphical user interface to display the genealogical summary, the genealogical summary comprising a machine-generated summary describing a relationship between the relative and the target user.

Embodiment 21. A computer-implemented method, comprising: receiving a request to generate a life story context enrichment for a target user; retrieving a time-series genealogy dataset associated with the target user, the time-series genealogy dataset comprising a plurality of genealogy records structured temporally; identifying a contextual data instance in the time-series genealogy dataset based on the user request; determining that the contextual data instance is expandable using out-of-band information; accessing a historical record related to the contextual data instance, the historical record comprising the out-of-band information; constructing a prompt using the contextual data instance, the historical record and the time-series genealogy dataset to input the prompt into a generative machine-learning model to request the generative machine-learning model to generate the life story context enrichment; receiving the life story context enrichment from the generative machine-learning model; and causing a graphical user interface to display the life story context enrichment.

Embodiment 22. The computer-implemented method of embodiment 21, wherein retrieving the time-series genealogy dataset associated with the target user comprises: communicating with a genealogy database that holds detailed genealogical records organized as per temporal structures; searching in the genealogy database to locate genealogy data linked with the target user; and compiling the genealogy data linked with the target user into a dataset comprising one or more genealogical records that are temporally structured.

Embodiment 23. The computer-implemented method of embodiment 21, wherein identifying the contextual data instance in the time-series genealogy dataset comprises: defining a structure to handle the user request and determining searchable parameters based on the defined structure; and executing a search of the determined parameters on the time-series genealogy dataset to identify contextual data instances that contains the searchable parameters.

Embodiment 24. The computer-implemented method of embodiment 21, wherein determining that the contextual data instance is expandable using the out of band information comprises: defining one or more features of an expandable data instance; checking whether the defined features are found in the contextual instance data; testing the data instance for potential expansion by querying external databases to fetch the out-of-band information; and marking the data instance as expandable based on the testing.

Embodiment 25. The computer-implemented method of embodiment 21, wherein accessing the historical record related to the contextual data instance comprises: determining a type of historical records that align with the contextual data instance, wherein the historical records comprises location records, employment records, historical event records, identification records; upon identifying the historical record type, communicating with a data store that manages the identified type of historical records; and retrieving the historical record that relates to the contextual data instance from the data store.

Embodiment 26. The computer-implemented method of embodiment 21, wherein constructing the prompt using the contextual data instance, the historical record and the time-series genealogy dataset to input the prompt into the generative machine-learning model to request the generative machine-learning model to generate the life story context enrichment comprises: integrating the contextual data instance, the information derived from the historical record and the time-series genealogy dataset; based on the integrating, generating the prompt in a format associated with the generative machine-learning model; and inputting the prompt into the generative machine-learning model.

Embodiment 27. The computer-implemented method of embodiment 26, wherein integrating the contextual data instance, the information derived from the historical record and the time-series genealogy dataset comprises: identifying shared parameters between the contextual data instance, the information derived from the historical record and the time-series genealogy dataset; based on the shared parameters, formatting each of the contextual data instance, the information derived from the historical record and the time-series genealogy dataset to a common structure so they can be easily integrated; and merging the contextual data instance, the information derived from the historical record and the time-series genealogy dataset based on the formatting and the shared parameters.

Embodiment 28. The computer-implemented method of embodiment 21, wherein receiving the life story context enrichment from the generative machine-learning model comprises: receiving a machine-generated enrichment summary of the contextual data instance and a machine-generated summary of the time-series genealogy dataset.

Embodiment 29. The computer-implemented method of embodiment 21, wherein causing a graphical user interface to display the life story context enrichment comprises: packaging the generated life story context enrichment in a format suitable for display; transmitting the packaged life story context enrichment to the graphical user interface; upon receipt of the packaged life story context enrichment, causing the graphical user interface of a user device to display the life story context enrichment.

Embodiment 30. The computer-implemented method of embodiment 28, wherein causing a graphical user interface to display the life story context enrichment comprises: providing a dynamic frontend framework on the graphical user interface to allow interaction with the life story context enrichment.

Embodiment 31. A system comprising: one or more processors; and memory configured to store instructions, wherein the instructions, when executed by the one or more processors, cause the one or more processors to perform steps comprising: receiving a request to generate a life story context enrichment of a target user; retrieving a time-series genealogy dataset associated with the target user, the time-series genealogy dataset comprising a plurality of genealogy records structured temporally; identifying a contextual data instance in the time-series genealogy dataset based on the user request; determining that the contextual data instance is expandable using out-of-band information; accessing a historical record related to the contextual data instance, the historical record comprising the out-of-band information; constructing a prompt using the contextual data instance, the historical record and the time-series genealogy dataset to input the prompt into a generative machine-learning model to request the generative machine-learning model to generate the life story context enrichment; receiving the life story context enrichment from the generative machine-learning model; and causing a graphical user interface to display the life story context enrichment.

Embodiment 32. The system of embodiment 31, wherein retrieving the time-series genealogy dataset associated with the target user comprises: communicating with a genealogy database that holds detailed genealogical records organized as per temporal structures; searching in the genealogy database to locate genealogy data linked with the target user; and compiling the genealogy data linked with the target user into a dataset comprising one or more genealogical records that are temporally structured.

Embodiment 33. The system of embodiment 31, wherein identifying the contextual data instance in the time-series genealogy dataset comprises: defining a structure to handle the user request and determining searchable parameters based on the defined structure; and executing a search of the determined parameters on the time-series genealogy dataset to identify contextual data instances that contains the searchable parameters;

Embodiment 34. The system of embodiment 31, wherein determining that the contextual data instance is expandable using the out of band information comprises: defining one or more features of an expandable data instance; checking whether the defined features are found in the contextual instance data; testing the data instance for potential expansion by querying external databases to fetch the out-of-band information; and marking the data instance as expandable based on the testing.

Embodiment 35. The system of embodiment 31, wherein accessing the historical record related to the contextual data instance comprises: determining a type of historical records that align with the contextual data instance, wherein the historical records comprises location records, employment records, historical event records, identification records; upon identifying the historical record type, communicating with a data store that manages the identified type of historical records; and retrieving the historical record that relates to the contextual data instance from the data store.

Embodiment 36. The system of embodiment 31, wherein constructing the prompt using the contextual data instance, the historical record and the time-series genealogy dataset to input the prompt into the generative machine-learning model to request the generative machine-learning model to generate the life story context enrichment comprises: integrating the contextual data instance, the information derived from the historical record and the time-series genealogy dataset; based on the integrating, generating the prompt in a format associated with the generative machine-learning model; and inputting the prompt into the generative machine-learning model.

Embodiment 37. The system of embodiment 36, wherein integrating the contextual data instance, the information derived from the historical record and the time-series genealogy dataset comprises: identifying shared parameters between the contextual data instance, the information derived from the historical record and the time-series genealogy dataset; based on the shared parameters, formatting each of the contextual data instance, the information derived from the historical record and the time-series genealogy dataset to a common structure so they can be easily integrated; and merging the contextual data instance, the information derived from the historical record and the time-series genealogy dataset based on the formatting and the shared parameters.

Embodiment 38. The system of embodiment 31, wherein receiving the life story context enrichment from the generative machine-learning model comprises: receiving a machine-generated enrichment summary of the contextual data instance and a machine-generated summary of the time-series genealogy dataset.

Embodiment 39. The system of embodiment 31, wherein causing a graphical user interface to display the life story context enrichment comprises: packaging the generated life story context enrichment in a format suitable for display; transmitting the packaged life story context enrichment to the graphical user interface; upon receipt of the packaged life story context enrichment, causing the graphical user interface of a user device to display the life story context enrichment.

Embodiment 40. A non-transitory computer readable medium for storing computer code comprising instructions, when executed by one or more computer processors, causing one or more computer processors to perform steps comprising: receiving a request to generate a life story context enrichment for a target user; retrieving a time-series genealogy dataset associated with the target user, the time-series genealogy dataset comprising a plurality of genealogy records structured temporally; identifying a contextual data instance in the time-series genealogy dataset based on the user request; determining that the contextual data instance is expandable using out-of-band information; accessing a historical record related to the contextual data instance, the historical record comprising the out-of-band information; constructing a prompt using the contextual data instance, the historical record and the time-series genealogy dataset to input the prompt into a generative machine-learning model to request the generative machine-learning model to generate the life story context enrichment; receiving the life story context enrichment from the generative machine-learning model; and causing a graphical user interface to display the life story context enrichment.

Embodiment 41. A computer-implemented method, comprising: accessing a historical record; converting the historical record into a structured dataset that is stored on a database; inputting the structured dataset to a machine learning model to generate a narrative; and causing a graphical user interface to display the generated narrative.

Embodiment 42. The computer-implemented method of embodiment 41, further comprising providing a prompt to the machine learning model to generate a further narrative based on the provided prompt.

Embodiment 43. The computer-implemented method of embodiment 41, further comprising: receiving an end user entry of a further search; and generating a further narrative based on the search.

Embodiment 44. The computer-implemented method of embodiment 41, wherein accessing the historical comprises: communicating with various databases that manage historical records, wherein the historical record comprises any one of a location record, birth registry, identification record, census data, employment record, historical event records; and identifying the historical record on a given database.

Embodiment 45. The computer-implemented method of embodiment 41, wherein converting the historical record into the structured dataset that is stored in the database comprises: extracting information included in the historical record to generate computer-readable data; and converting the computer-readable data into a defined structured dataset.

Embodiment 46. The computer-implemented method of embodiment 45, wherein extracting information included in the historical record to generate computer-readable data comprises: applying an optical character recognition process to scan and transcribe the historical record into computer-readable text.

Embodiment 47. The computer-implemented method of embodiment 45, wherein converting the computer-readable data into the defined structured dataset comprises: defining the structured dataset; and organizing the computer-readable data into the defined structured dataset.

Embodiment 48. A system comprising: one or more processors; and memory configured to store instructions, wherein the instructions, when executed by the one or more processors, cause the one or more processors to perform steps comprising: accessing a historical record; converting the historical record into a structured dataset that is stored on a database; inputting the structured dataset to a machine learning model to generate a narrative; and causing a graphical user interface to display the generated narrative.

Embodiment 49. The system of embodiment 48, further comprising providing a prompt to the machine learning model to generate a further narrative based on the provided prompt.

Embodiment 50. The system of embodiment 49, further comprising: receiving an end user entry of a further search; and generating a further narrative based on the search.

Embodiment 51. A computer-implemented method, comprising: receiving a request to generate context data associated with a genealogy record, the genealogy record comprising information about an individual; accessing historical records related to the genealogy record; searching through the historical records for data related to the individual; generating a plurality of embeddings from the data related to the genealogy record, the embeddings comprising a first set of one or more embeddings generated from the data related to the individual and a second set of one or more embeddings generated from a family tree data for the individual; applying the plurality of embeddings into a generative machine-learning model to generate the context data for the individual; and causing a graphical user interface to display the context data associated with the genealogy record.

Embodiment 52. The computer-implemented method of embodiment 51, wherein accessing the historical records related to the genealogy record comprises: communicating with various databases that manage historical records, wherein the historical records comprises location records, birth registries, identification records, census data, employment records, historical event records; and identifying the historical records that related to the genealogy record.

Embodiment 53. The computer-implemented method of embodiment 51, wherein searching through the historical records for data related to the individual comprises: converting the data related to the individual into a structured query that can be used to search databases associated with the historical records; executing the structured query on one or more databases associated with the historical records; processing records returned by the query, wherein processing search results returned by the query comprises checking the returned records for relevance and filtering out irrelevant records; and extracting data from the processed records, wherein the data is usable to generate context data for the genealogy record.

Embodiment 54. The computer-implemented method of embodiment 53, wherein converting the data related to the individual into a structured query that can be used to search databases of the historical records comprises defining fields, keywords, and criteria based on the data related to the individual.

Embodiment 55. The computer-implemented method of embodiment 51, wherein converting the data related to the individual into the structured query that can be used to search databases associated with the historical records comprises: defining fields, keywords, or criteria based on the data related to the individual.

Embodiment 56. The computer-implemented method of embodiment 51, wherein generating the plurality of embeddings from the data related to the genealogy record comprises: converting each component of the data related to the genealogy record and each component of the family tree data into a numerical representation; applying a machine-learned model trained on similar data to the numerical representation of the genealogy record data to transform it into the first set of embeddings, wherein the embeddings position the individual's data within the latent space of the machine learning model, and wherein each embedding's position is determined by the characteristics of the individual's data such that similar data instances or characteristics are positioned closer together within the latent space; and applying a machine-learned model trained on similar data to the numerical representation of the family tree data to transform it into the second set of embeddings, wherein similar family trees or familial relationships result in embeddings positioned closer together in the latent space of the machine learning model.

Embodiment 57. The computer-implemented method of embodiment 51, wherein converting each component of the data related to the genealogy record and each component of the family tree data into the numerical representation comprises: mapping a categorical variable and/or an ordinal variable into a numerical representation that can be interpreted by a machine learning model.

Embodiment 58. The computer-implemented method of embodiment 51, wherein applying the plurality of embeddings into the generative machine-learning model to generate the context data for the individual comprises: inputting the first and second sets of embeddings into the generative machine-learning model; and generating, by the generative machine-learning model, the context data based on the first and second sets of embeddings, wherein generating by the generative machine-learning model the context data based on the first and second sets of embeddings comprises extracting patterns that exist in the first and second sets of embeddings and generating the context data based on the extracted patterns.

Embodiment 59. The computer-implemented method of embodiment 51, wherein causing a graphical user interface to display the context data associated with the genealogy record comprises: packaging the generated context data in a format suitable for display; transmitting the packaged context data is to the graphical user interface; upon receipt of the packaged context data, causing the graphical user interface of a user device to display the context data.

Embodiment 60. The computer-implemented method of embodiment 59, wherein causing a graphical user interface to display the context data associated with the genealogy record comprises: providing a dynamic frontend framework on the graphical user interface to allow interaction with the context data.

Embodiment 61. A system comprising: one or more processors; and memory configured to store instructions, wherein the instructions, when executed by the one or more processors, cause the one or more processors to perform steps comprising: receiving a request to generate context data associated with a genealogy record, the genealogy record comprising information about an individual; accessing historical records related to the genealogy record; searching through the historical records for data related to the individual; generating a plurality of embeddings from the data related to the genealogy record, the embeddings comprising a first set of one or more embeddings generated from the data related to the individual and a second set of one or more embeddings generated from a family tree data for the individual; applying the plurality of embeddings into a generative machine-learning model to generate the context data for the individual; and causing a graphical user interface to display the context data associated with the genealogy record.

Embodiment 62. The system of embodiment 61, wherein accessing the historical records related to the genealogy record comprises: communicating with various databases that manage historical records, wherein the historical records comprises location records, birth registries, identification records, census data, employment records, historical event records; and identifying the historical records that related to the genealogy record.

Embodiment 63. The system of embodiment 61, wherein searching through the historical records for data related to the individual comprises: converting the data related to the individual into a structured query that can be used to search databases associated with the historical records; executing the structured query on one or more databases associated with the historical records; processing records returned by the query, wherein processing search results returned by the query comprises checking the returned records for relevance and filtering out irrelevant records; and extracting data from the processed records, wherein the data is usable to generate context data for the genealogy record.

Embodiment 64. The system of embodiment 63, wherein converting the data related to the individual into a structured query that can be used to search databases of the historical records comprises defining fields, keywords, and criteria based on the data related to the individual.

Embodiment 65. The system of embodiment 61, wherein converting the data related to the individual into the structured query that can be used to search databases associated with the historical records comprises: defining fields, keywords, or criteria based on the data related to the individual.

Embodiment 66. The system of embodiment 61, wherein generating the plurality of embeddings from the data related to the genealogy record comprises: converting each component of the data related to the genealogy record and each component of the family tree data into a numerical representation; applying a machine-learned model trained on similar data to the numerical representation of the genealogy record data to transform it into the first set of embeddings, wherein the embeddings position the individual's data within the latent space of the machine learning model, and wherein each embedding's position is determined by the characteristics of the individual's data such that similar data instances or characteristics are positioned closer together within the latent space; and applying a machine-learned model trained on similar data to the numerical representation of the family tree data to transform it into the second set of embeddings, wherein similar family trees or familial relationships result in embeddings positioned closer together in the latent space of the machine learning model.

Embodiment 67. The system of embodiment 61, wherein converting each component of the data related to the genealogy record and each component of the family tree data into the numerical representation comprises: mapping a categorical variable and/or an ordinal variable into a numerical representation that can be interpreted by a machine learning model.

Embodiment 68. The system of embodiment 61, wherein applying the plurality of embeddings into the generative machine-learning model to generate the context data for the individual comprises: inputting the first and second sets of embeddings into the generative machine-learning model; and generating, by the generative machine-learning model, the context data based on the first and second sets of embeddings, wherein generating by the generative machine-learning model the context data based on the first and second sets of embeddings comprises extracting patterns that exist in the first and second sets of embeddings and generating the context data based on the extracted patterns.

Embodiment 69. The system of embodiment 61, wherein causing a graphical user interface to display the context data associated with the genealogy record comprises: packaging the generated context data in a format suitable for display; transmitting the packaged context data is to the graphical user interface; upon receipt of the packaged context data, causing the graphical user interface of a user device to display the context data.

Embodiment 70. A non-transitory computer readable medium for storing computer code comprising instructions, when executed by one or more computer processors, causing one or more computer processors to perform steps comprising: receiving a request to generate context data associated with a genealogy record, the genealogy record comprising information about an individual; accessing historical records related to the genealogy record; searching through the historical records for data related to the individual; generating a plurality of embeddings from the data related to the genealogy record, the embeddings comprising a first set of one or more embeddings generated from the data related to the individual and a second set of one or more embeddings generated from a family tree data for the individual; applying the plurality of embeddings into a generative machine-learning model to generate the context data for the individual; and causing a graphical user interface to display the context data associated with the genealogy record.

Embodiment 71. A computer-implemented method, comprising: receiving data generated by a generative machine-learning model; inputting the data into a machine learning evaluator model to evaluate the data across one or more predefined categories of potential noncompliance, wherein evaluating the data across one or more predefined categories of potential noncompliance comprises: providing a score for each category of the predefined categories for the data, aggregating scores across multiple categories to generate a compound evaluation score, comparing the compound evaluation score to a predetermined threshold of noncompliance, based on the comparing, determining if the data is noncompliant, and generating an indication of the noncompliance of the data; and causing a graphical user interface to display an indication of the noncompliance of the data.

Embodiment 72. The computer-implemented method of embodiment 71, wherein providing the score for each category of the predefined categories for the data comprises: assessing a degree of correlation or similarity between the input data and patterns learned by the machine learning evaluator model determining a probability of the input data falling within a particular category based on learned patterns; and based on the determining, providing the score for each category of the predefined categories.

Embodiment 73. The computer-implemented method of embodiment 71, wherein aggregating the scores across multiple categories to generate the compound evaluation score comprises: assigning a weight to each category of the predefined categories; and generating a compound evaluation score for the input data based on the individual score and weight of each category of the predefined categories, wherein the compound evaluation score represents a summative view of the potential noncompliance of the data across all categories.

Embodiment 74. The computer-implemented method of embodiment 71, wherein comparing the compound evaluation score to the predetermined threshold of noncompliance comprises: setting the predetermined threshold based on historical data, domain knowledge, and system requirements, wherein the predetermined threshold is a reference value that separates compliant data from noncompliant data.

Embodiment 75. The computer-implemented method of embodiment 71, wherein comparing the compound evaluation score to the predetermined threshold of noncompliance comprises: setting the predetermined threshold based on historical data, domain knowledge, and system requirements, wherein the predetermined threshold is a reference value that separates compliant data from noncompliant data.

Computing Machine Architecture

Figure 11:
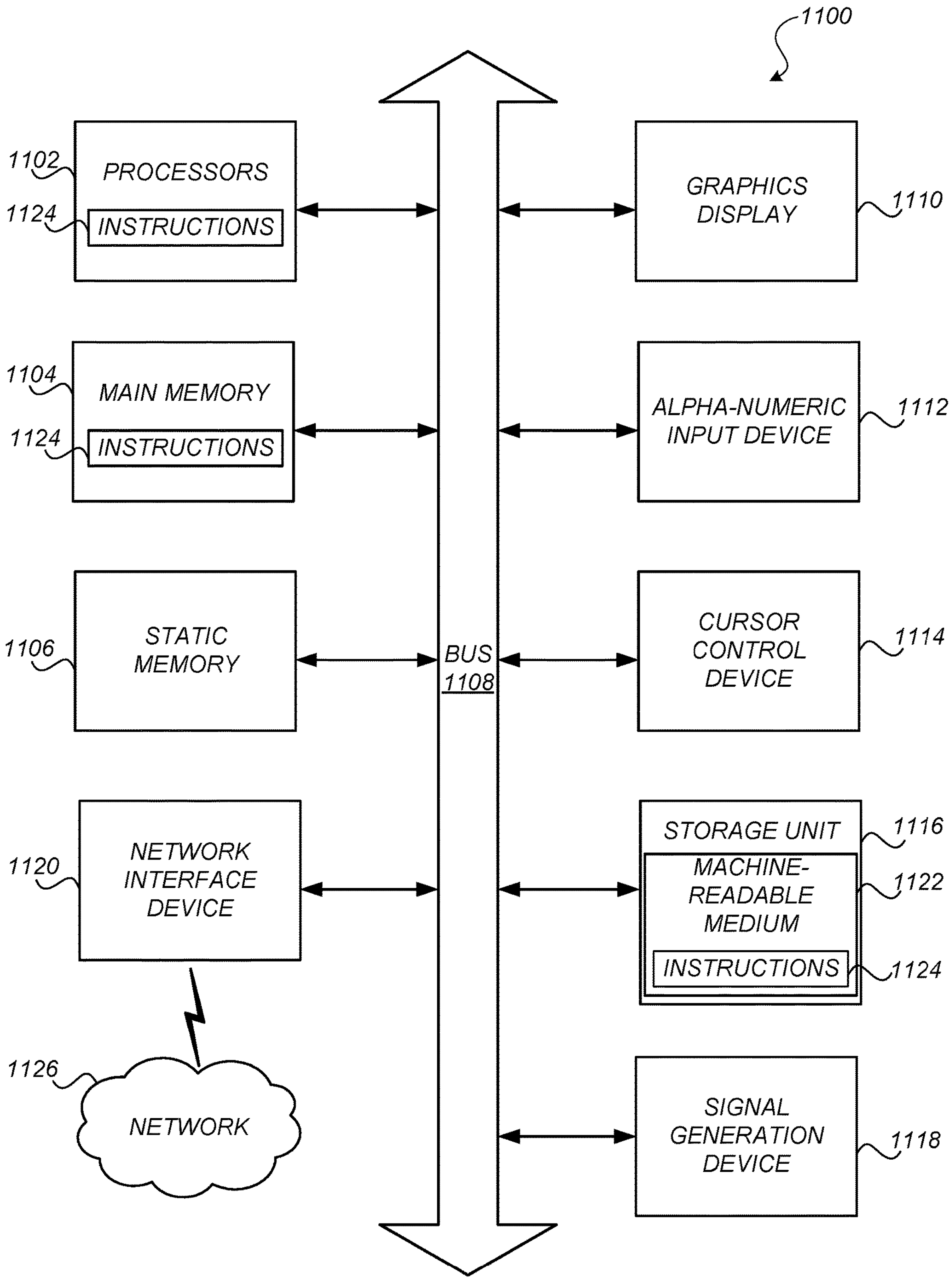
FIG. 11 is a block diagram of an example computing device, in accordance with some embodiments.

FIG. 11 is a block diagram illustrating components of an example computing machine that is capable of reading instructions from a computer-readable medium and executing them in a processor (or controller). A computer described herein may include a single computing machine shown in FIG. 11, a virtual machine, a distributed computing system that includes multiple nodes of computing machines shown in FIG. 11, or any other suitable arrangement of computing devices.

By way of example, FIG. 11 shows a diagrammatic representation of a computing machine in the example form of a computer system 1100 within which instructions 1124 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 11 may correspond to any software, hardware, or combined components shown in FIGS. 1-9 including but not limited to, the client device 110, the computing server 130, and various engines, interfaces, terminals, components, and machines shown in the figures. While FIG. 11 shows various hardware and software elements, each of the components described in FIGS. 1-9 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1124 that specify actions to be taken by that machine. Further, while only a single machine is illustrated, the terms "machine" and "computer" may also be taken to include any collection of machines that individually or jointly execute instructions 1124 to perform any one or more of the methodologies discussed herein.

The example computer system 1100 includes one or more processors 1102 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1100 may also include a memory 1104 that stores computer code including instructions 1124 that may cause the processor 1102 to perform certain actions when the instructions are executed, directly or indirectly by the processor 1102. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One or more methods described herein improve the operation speed of the processor 1102 and reduce the space required for the memory 1104. For example, the database processing techniques and machine learning methods described herein reduce the complexity of the computation of the processors 1102 by applying one or more novel techniques that simplify the steps in rendering digital representation in an artificial reality experience. The algorithms described herein also reduce the size of the digital representation to reduce the storage space requirement for memory 1104.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though the specification or the claims may refer to some processes to be performed by a processor, this may be construed to include a joint operation of multiple distributed processors. In some embodiments, a computer-readable medium comprises one or more computer-readable media that, individually, together, or distributedly, comprise instructions that, when executed by one or more processors, cause the one or more processors to perform, individually, together, or distributedly, the steps of the instructions stored on the one or more computer-readable media. Similarly, a processor comprises one or more processors or processing units that, individually, together, or distributedly, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situation such as in multiple processors of a system in a chip, in Cloud computing, or in distributed computing.

The computer system 1100 may include a main memory 1104, and a static memory 1106, which are configured to communicate with each other via a bus 1108. The computer system 1100 may further include a graphics display unit 1110 (e.g., a plasma display panel (PDP), a liquid crystal display (LCD), a projector, or a cathode ray tube (CRT)). The graphics display unit 1110, controlled by the processor 1102, displays a graphical user interface (GUI) to display one or more results and data generated by the processes described herein. The computer system 1100 may also include an alphanumeric input device 1112 (e.g., a keyboard), a cursor control device 1114 (e.g., a mouse, a trackball, a joystick, a motion sensor, or other pointing instruments), a storage unit 1116 (a hard drive, a solid-state drive, a hybrid drive, a memory disk, etc.), a signal generation device 1118 (e.g., a speaker), and a network interface device 1120, which also are configured to communicate via the bus 1108.

The storage unit 1116 includes a computer-readable medium 1122 on which is stored instructions 1124 embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting computer-readable media. The instructions 1124 may be transmitted or received over a network 1126 via the network interface device 1120.

While computer-readable medium 1122 is shown in an example embodiment to be a single medium, the term "computer-readable medium" should be taken to include a single medium or multiple media (e.g., a centralized or distributed database, or associated caches and servers) able to store instructions (e.g., instructions 1124). The computer-readable medium may include any medium that is capable of storing instructions (e.g., instructions 1124) for execution by the processors (e.g., processors 1102) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, or storage medium, as well. The dependencies or references in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcodes, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that are issued on an application based hereon. Accordingly, the disclosure of the embodiments is intended to be illustrative, but not limited, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method, comprising:

receiving a request to generate a genealogical summary of a target user;

retrieving genealogical records associated with the target user, the genealogical records comprising a documentation record and a family tree that is arranged in a hierarchical data structure comprising nodes connected by edges;

identifying a path between a relative node representing a relative and a focus node representing the target user;

traversing the path to convert the hierarchical data structure along the path to a relationship text string that comprises a description of relationships along the path in natural language;

generating a plurality of embeddings from the genealogical records, the embeddings comprising a first set of one or more embeddings generated from the relationship text string and a second set of one or more embeddings generated from the documentation record;

inputting the plurality of embeddings into a generative machine-learning model to generate the genealogical summary of the target user; and causing a graphical user interface to display the genealogical summary, the genealogical summary comprising a machine-generated summary describing a relationship between the relative and the target user.

2. The computer-implemented method of claim 1, wherein retrieving the genealogical records associated with the target user comprises:

identifying the target user by a parameter including name and date of birth; and searching through a datastore to retrieve the genealogical records containing a reference to the identified target user.

3. The computer-implemented method of claim 1, wherein identifying the path between the relative node representing a relative and a focus node representing the target user comprises:

selecting a particular relative node; and searching through the family tree to identify a path that leads from the focus node to the relative node.

4. The computer-implemented method of claim 1, wherein traversing the path to convert the hierarchical data structure along the path to a relationship text string that comprises the description of relationships along the path in natural language comprises:

traversing the path node by node from the focus node representing the target user to the relative node representing the relative by following the edges representing relationships in the hierarchical structure, wherein each node represents an individual in the family tree and the edge connecting two nodes symbolizes the relationship between those two individuals; and converting the traversed path into the relationship text string.

5. The computer-implemented method of claim 4, wherein converting the traversed path into the relationship text string comprises:

converting the edges representing the relationships between individuals along the traversed path into natural language.

6. The computer-implemented method of claim 1, wherein generating the plurality of embeddings from the genealogical records and the documentation record comprises:

preprocessing the relationship text string;

converting each word of the preprocessed relationship text string into a first set of numerical representation;

applying a machine-learned model trained on similar data to the first set of numerical representations to transform them into the first set of embeddings, wherein the embeddings position the relationship text string's data within the latent space of the machine learning model, and wherein each embedding's position is determined by characteristics of the relationship text string's data such that similar data instances or characteristics are positioned closer together within the latent space;

preprocessing the documentation record;

converting features of the preprocessed documentation record into a second set of numerical representations; and applying a trained machine-learned model to transform the second set of numerical representations into the second set of embeddings, wherein the embeddings position the documentation record's data within the latent space of the machine learning model, and wherein each embedding's position is determined by the characteristics of the documentation record's data such that similar data instances or characteristics are positioned closer together within the latent space.

7. The computer-implemented method of claim 6, wherein preprocessing the relationship text string comprises:

tokenizing the relationship text string into individual words to reduce words to their root form and/or remove any stop word that does not affect a semantic value of the text string.

8. The computer-implemented method of claim 6, wherein preprocessing the documentation record comprises:

extracting features from the documentation record.

9. The computer-implemented method of claim 1, wherein causing the graphical user interface to display the genealogical summary comprises:

packaging the generated genealogical summary in a format suitable for display;

transmitting the packaged genealogical summary to the graphical user interface;

upon receipt of the packaged genealogical summary, causing the graphical user interface of a user device to display the genealogical summary.

10. The computer-implemented method of claim 8, wherein causing a graphical user interface to display the genealogical summary comprises:

providing a dynamic frontend framework on the graphical user interface to allow interaction with the genealogical summary.

11. A system comprising:

one or more processors; and memory configured to store instructions, wherein the instructions, when executed by the one or more processors, cause the one or more processors to perform steps comprising:

receiving a request to generate a genealogical summary of a target user;

retrieving genealogical records associated with the target user, the genealogical records comprising a documentation record and a family tree that is arranged in a hierarchical data structure comprising nodes connected by edges;

identifying a path between a relative node representing a relative and a focus node representing the target user;

traversing the path to convert the hierarchical data structure along the path to a relationship text string that comprises a description of relationships along the path in natural language;

generating a plurality of embeddings from the genealogical records, the embeddings comprising a first set of one or more embeddings generated from the relationship text string and a second set of one or more embeddings generated from the documentation record;

inputting the plurality of embeddings into a generative machine-learning model to generate the genealogical summary of the target user; and causing a graphical user interface to display the genealogical summary, the genealogical summary comprising a machine-generated summary describing a relationship between the relative and the target user.

12. The system of claim 11, wherein retrieving the genealogical records associated with the target user comprises:

identifying the target user by a parameter including name and date of birth; and searching through a datastore to retrieve the genealogical records containing a reference to the identified target user.

13. The system of claim 11, wherein identifying the path between the relative node representing a relative and a focus node representing the target user comprises:

selecting a particular relative node; and searching through the family tree to identify a path that leads from the focus node to the relative node.

14. The system of claim 11, wherein traversing the path to convert the hierarchical data structure along the path to a relationship text string that comprises the description of relationships along the path in natural language comprises:

traversing the path node by node from the focus node representing the target user to the relative node representing the relative by following the edges representing relationships in the hierarchical structure, wherein each node represents an individual in the family tree and the edge connecting two nodes symbolizes the relationship between those two individuals; and converting the traversed path into the relationship text string.

15. The system of claim 11, wherein converting the traversed path into the relationship text string comprises:

converting the edges representing the relationships between individuals along the traversed path into natural language.

16. The system of claim 11, wherein generating the plurality of embeddings from the genealogical records and the documentation record comprises:

preprocessing the relationship text string;

converting each word of the preprocessed relationship text string into a first set of numerical representation;

applying a machine-learned model trained on similar data to the first set of numerical representations to transform them into the first set of embeddings, wherein the embeddings position the relationship text string's data within the latent space of the machine learning model, and wherein each embedding's position is determined by characteristics of the relationship text string's data such that similar data instances or characteristics are positioned closer together within the latent space;

preprocessing the documentation record;

converting features of the preprocessed documentation record into a second set of numerical representations; and applying a trained machine-learned model to transform the second set of numerical representations into the second set of embeddings, wherein the embeddings position the documentation record's data within the latent space of the machine learning model, and wherein each embedding's position is determined by the characteristics of the documentation record's data such that similar data instances or characteristics are positioned closer together within the latent space.

17. The system of claim 16, wherein preprocessing the relationship text string comprises:

tokenizing the relationship text string into individual words to reduce words to their root form and/or remove any stop word that does not affect a semantic value of the text string.

18. The system of claim 16, wherein preprocessing the documentation record comprises:

extracting features from the documentation record.

19. The system of claim 11, wherein causing the graphical user interface to display the genealogical summary comprises:

packaging the generated genealogical summary in a format suitable for display;

transmitting the packaged genealogical summary to the graphical user interface;

upon receipt of the packaged genealogical summary, causing the graphical user interface of a user device to display the genealogical summary.

20. A non-transitory computer readable medium for storing computer code comprising instructions, when executed by one or more computer processors, causing one or more computer processors to perform steps comprising:

receiving a request to generate a genealogical summary of a target user;

retrieving genealogical records associated with the target user, the genealogical records comprising a documentation record and a family tree that is arranged in a hierarchical data structure comprising nodes connected by edges;

identifying a path between a relative node representing a relative and a focus node representing the target user;

traversing the path to convert the hierarchical data structure along the path to a relationship text string that comprises a description of relationships along the path in natural language;

generating a plurality of embeddings from the genealogical records, the embeddings comprising a first set of one or more embeddings generated from the relationship text string and a second set of one or more embeddings generated from the documentation record;

inputting the plurality of embeddings into a generative machine-learning model to generate the genealogical summary of the target user; and causing a graphical user interface to display the genealogical summary, the genealogical summary comprising a machine-generated summary describing a relationship between the relative and the target user.

* * * * *